US012394415B1

(12) United States Patent
Kinsey

(10) Patent No.: US 12,394,415 B1
(45) Date of Patent: *Aug. 19, 2025

(54) DEVICE FUNCTIONALITY IDENTIFICATION

(71) Applicant: Amazon Technologies, Inc., Seattle, WA (US)

(72) Inventor: Jeffrey B Kinsey, San Mateo, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/200,859

(22) Filed: May 23, 2023

Related U.S. Application Data

(63) Continuation of application No. 16/706,276, filed on Dec. 6, 2019, now Pat. No. 11,721,331.

(51) Int. Cl.
*G10L 15/22* (2006.01)
*G06F 3/16* (2006.01)
*G10L 15/18* (2013.01)
*H04L 12/28* (2006.01)

(52) U.S. Cl.
CPC ............. *G10L 15/22* (2013.01); *G06F 3/167* (2013.01); *G10L 15/1815* (2013.01); *H04L 12/2829* (2013.01); *G10L 2015/223* (2013.01); *G10L 2015/228* (2013.01)

(58) Field of Classification Search
CPC ................ G10L 15/22; G10L 15/1815; G10L 2015/223; G10L 2015/228; G06F 3/167; H04L 12/2829
See application file for complete search history.

(56) References Cited

U.S. PATENT DOCUMENTS

| 9,836,069 B1 | 12/2017 | Nelmes et al. |
| 9,984,686 B1 * | 5/2018 | Mutagi ................ G10L 17/22 |
| 2004/0193422 A1 * | 9/2004 | Fado .................... H03G 3/32 |
| | | 704/260 |

(Continued)

OTHER PUBLICATIONS

Office Action for U.S. Appl. No. 16/706,276, mailed on Sep. 21, 2022, Jeffrey B Kinsey, "Device Functionality Identification", 46 pages.

(Continued)

*Primary Examiner* — Darioush Agahi
(74) *Attorney, Agent, or Firm* — Nicholson De Vos Webster & Elliott LLP

(57) ABSTRACT

Systems and methods for device functionality identification are disclosed. For example, a connected device may be coupled to a secondary device. A user may request operation of the connected device, and a system may determine that the connected device is of a given device type. Based on the connected device being of the given device type, the system may cause another device having an environmental sensor to send sensor data indicating environmental changes sensed by the sensor. The connected device may be operated and the sensor may sense environmental changes caused by operation of the connected device. When the sensed environmental changes indicate the device type of the secondary device, a recommendation to change the device type of the connected device to the device type of the secondary device may be provided to a user device associated with the connected device.

20 Claims, 10 Drawing Sheets

(56) References Cited

U.S. PATENT DOCUMENTS

| | | |
|---|---|---|
| 2011/0213900 A1 | 9/2011 | Nakamoto et al. |
| 2016/0179070 A1* | 6/2016 | Hwang ................. G05B 15/02 700/83 |
| 2017/0115019 A1* | 4/2017 | Desmet ................ H05B 47/115 |
| 2017/0163519 A1* | 6/2017 | Bowers .................. H04L 43/50 |
| 2017/0264452 A1 | 9/2017 | Vollmer et al. |
| 2018/0270576 A1* | 9/2018 | Chua .................... H04L 12/282 |
| 2020/0112454 A1 | 4/2020 | Brown et al. |
| 2021/0067622 A1* | 3/2021 | Park ................. H04M 1/72415 |

OTHER PUBLICATIONS

Office Action for U.S. Appl. No. 16/706,276, mailed on Jan. 13, 2022, Kinsey, "Device Functionality Identification", 46 pages.

Office Action for U.S. Appl. No. 16/706,276, mailed on May 16, 2022, Kinsey, "Device Functionality Identification", 45 Pages.

Office Action for U.S. Appl. No. 16/706,276, mailed on Aug. 19, 2021, Kinsey, "Device Functionality Identification", 43 pages.

\* cited by examiner

DEVICE FUNCTIONALITY IDENTIFICATION

BACKGROUND

This application is a continuation of and claims priority to U.S. patent application Ser. No. 16/706,276, filed Dec. 6, 2019, titled "Device Functionality Identification," the entirety of which is incorporated herein by reference.

BACKGROUND

Use of electronic devices to perform actions has become common. Some environments, such as homes, may include multiple connected devices as well as one or more voice-controlled devices that may be utilized to control operation of the connected devices. Described herein are improvements in technology and solutions to technical problems that can be used to, among other things, assist in configuration of connected devices.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
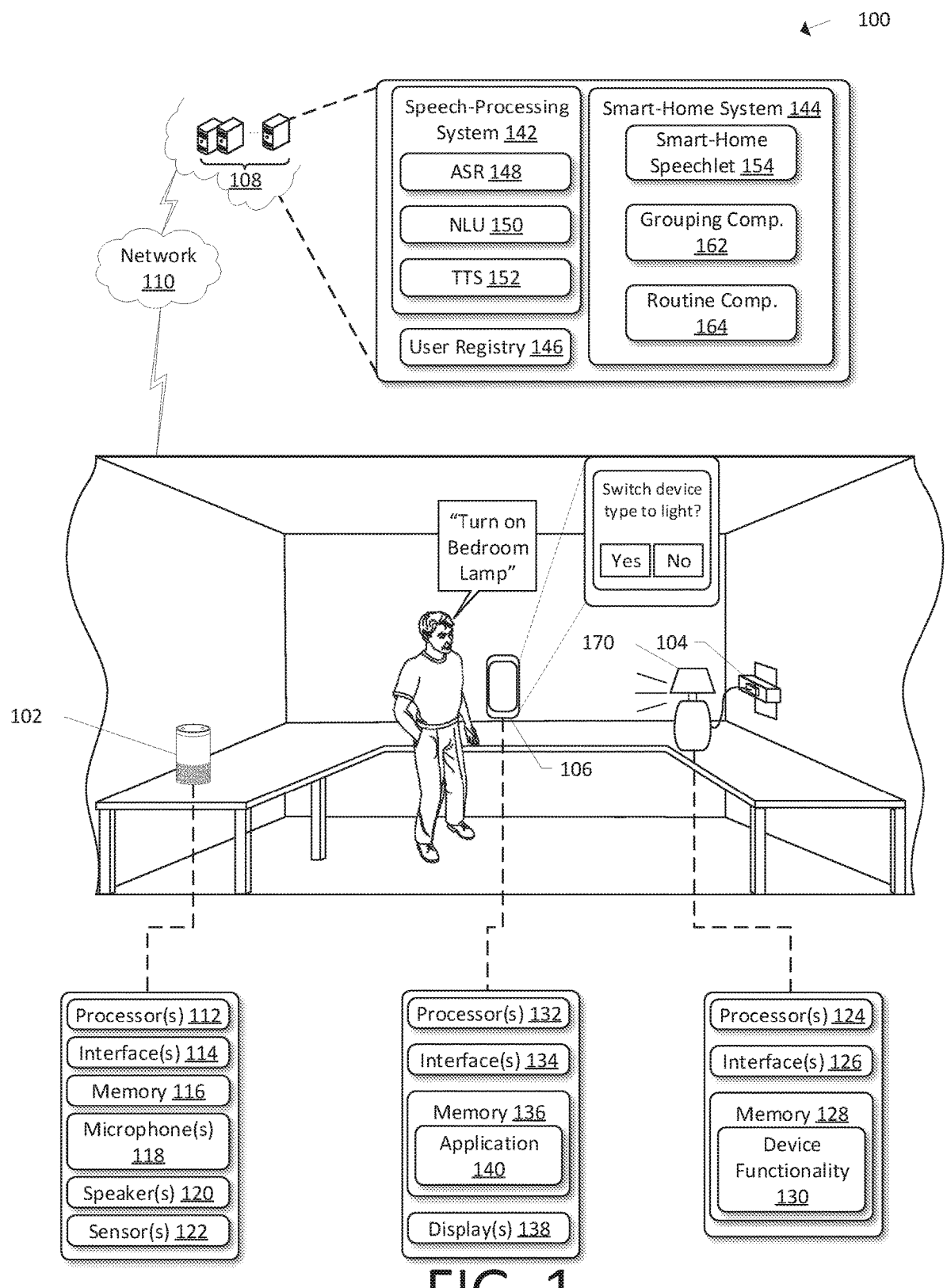
FIG. 1 illustrates a schematic diagram of an example environment for device functionality identification.

Systems and methods for device functionality identification are disclosed. Take, for example, a building that includes one or more electronic devices such as voice-controlled devices (e.g., Echo devices, mobile phones, tablets, personal computers, etc.) and other types of connected (e.g., "smart") devices (e.g., lights, plugs, locks, thermostats, appliances, televisions, clocks, smoke detectors, doorbells, security camera, security-system contacts, etc.). The connected devices may be controlled using the voice-controlled devices, via touch input to a user device such as a tablet, presence detection (e.g., motion sensor, radar, sounds, etc.), time-based triggers (e.g., timers, time-based routines, time of day, etc.), and/or by physically operating the connected devices themselves. In some examples, a given building may be associated with many voice-controlled devices and/or many connected devices dispersed across many rooms of the building. Additionally, at least some of the connected devices may be "plugs," which may be configured to plug into a power outlet and also be configured as a power receptacle that may receive a power cord of another device. For example, such plug devices may plug into a wall outlet and may having one or more other devices, such as a lamp, appliance, heater, etc. plugged into the plug devices. In examples, such plug devices may include components that allow the plug devices to communicate, such as wirelessly, with the voice-controlled devices and/or other devices and systems. These plug devices may be assigned a "plug" device type, and this device type may be utilized to identify the device and/or to determine functionality associated with the device, for example. In these examples, identifying the secondary device that is plugged in to the plug device may be beneficial because that secondary device may include functionality different from the plug device and/or be of a different device type. In other examples, the electronic devices may include a hub device, such as a wireless hub device, that may be utilized to control connected devices.

In these and other examples, determining the device type of the secondary device may include sending a command to change the state of the device and/or receiving an indication that a state of the plug device has changed and receiving data indicating that an environmental change has occurred based at least in part on the state of the plug device changing. A system may analyze the environmental change in association with the device-state change of the plug device to determine the device type of the secondary device. Thereafter, a notification may be generated and sent to a user device associated with the plug device requesting that the device type of the plug device be changed from the plug device type to a device type that corresponds to the secondary device. For example, a user may request that the state of the connected device be changed. This request may, for example, be an audible request such as "turn Plug 1 on." The voice-controlled device may capture audio representing the audible request and may generate corresponding audio data. The audio data may be sent to a speech-processing system to generate intent data representing the request to operate the connected device. The speech-processing system may determine that the request is associated with smart-home functionality and may send the intent data to a smart-home system to handle responding to the request.

A smart-home speechlet of the smart-home system may receive the intent data and may determine one or more applications, which may in examples be described herein as skills, that are configured to handle the given intent. The applications may be utilized to communicate the request with a system associated with the connected device and to receive a response from that system. For example, the smart-home speechlet may determine that "Plug 1" is associated with a given application and may request that the application and/or the system take an action on the connected device that corresponds to the request, here turning Plug 1 on. In this example or in other examples, the smart-home speechlet may generate directive data representing a directive to control the connected device. The directive data may be sent to the voice-controlled device and/or to the connected device, which may cause the connected device to be operated. By way of illustration, the operation may be to turn on Plug 1, which may allow electricity to flow from the outlet, through Plug 1, and to the secondary device that is plugged into Plug 1. For ease of illustration and not by way of limitation, the secondary device may be, for example, a light-emitting device such as a lamp. In this example, operating Plug 1 as described above may cause the secondary device to emit light.

In addition to operating the connected device, one or more operations may be performed to determine the device type of the secondary device. For example, the smart-home system, having received the intent data from the speech-processing system, may utilize the intent data and/or other data associated with the user request to determine account data associated with the voice-controlled device from which the audio data was received. The smart-home speechlet may utilize the account data to determine which connected devices are associated with the voice-controlled device and the device types of those devices. With respect to a given request to operate a connected device, the smart-home speechlet may identify the device identifier of the connected device to be operated and may identify the device type associated with that device identifier. In the example provided herein, the smart-home speechlet may identify the device identifier for Plug 1 and may identify the device type as a plug device. Having identified the connected device as being associated with a predefined device type, here a plug device type by way of example, the smart-home speechlet may initiate a process for determining the device type of the secondary device. For example, the smart-home speechlet may select a device to be utilized to sense an environmental change in the environment in which the devices at issue are disposed.

The smart-home speechlet may be configured to determine which devices in the environment include one or more environmental sensors and/or may be configured to determine which device or devices are to be utilized to sense an environmental change utilizing the environmental sensor(s). For example, the user account may include data indicating which devices are associated with the connected device and the hardware configuration(s) of those devices. A given device may be considered a candidate device for selection when, for example, that device includes an environmental sensor as indicated from the account data. Examples of environmental sensors may include, for example, a light sensor such as an ambient light sensor, a microphone, a temperature sensor, an infrared sensor, one or more radar sensors, a motion sensor, a camera, and/or any other device that may sense a change in one or more conditions of an environment. In addition to identifying one or more candidate devices that include an environmental sensor, the smart-home speechlet may select one or more of the candidate devices to receive sensor data from. For example, given account data may indicate that a given environment includes multiple voice-controlled devices that have an ambient light sensor. The smart-home speechlet may also be configured to receive data associated with locations of the various voice-controlled devices and may utilize that data to determine which voice-controlled device(s) are closest to the connected device and/or that are otherwise positioned to detect an environmental change caused by operation of the connected device. The data associated with locations of devices may include, for example, spatial-perception data indicating distance between devices as determined from time-of-flight information, device-affinity data indicating which voice-controlled devices communicate most frequently with given connected devices, naming data indicating friendly names associated with voice-controlled device and/or connected devices, device-usage data indicating how voice-controlled devices and/or connected devices have been historically utilized, and/or user-setting data indicating configuration of the voice-controlled devices and/or connected devices by a user of the devices, for example. Utilizing the example provided above, the smart-home speechlet may identify a voice-controlled device that has an ambient light sensor and that is located in the same room as the connected device to be operated as the device from which to receive sensor data. It should be understood that while this example illustrates selection of one device from which to receive sensor data, more than one device may be selected. Additionally, while the example device includes an ambient light sensor, it should be understood that the selected device(s) may include an additional and/or different environmental sensor.

The smart-home speechlet may then generate and send a command to the selected device to, in examples, activate the sensor and/or to instruct the device to send sensor data as generated by the sensor. Selection of a device and sending of the command to the selected device to provide sensor data may be performed prior to operation of the connected device, as described above. In this way, a device may be selected and the sensor of the device may be activated prior to the connected device being operated. As such, when the connected device is operated, a change to one or more conditions of the environment caused by operation of the connected device may be detected by the sensor of the selected device. Utilizing the example provided above, the ambient light sensor of the selected voice-controlled device may be activated and/or may be transitioned to a state where sensor data is being generated and/or sent. Thereafter, the command to operate the connected device may be sent to the connected device, which may cause the connected device, in this example, to turn on. By turning on, the light-emitting device that is plugged into the connected device may start emitting light into the environment in which the connected device is situated. The ambient light sensor, which is sensing light levels in the environment, may detect the change in light level caused by the light-emitting device emitting light. For example, the ambient light sensor may be configured to sense lumens and may detect an increase in lumens when the connected device is operated. Sensor data indicating this increase in lumens may be generated and may be sent, for example, to a smart-home speechlet.

The smart-home speechlet may receive the sensor data as well as state-change data indicating the state change of the connected device. In examples, the sensor data and the state-change data may be timestamped such that the smart-home speechlet is configured to determine that a given environmental change as detected by a device sensor correlates to a given state change of a connected device. Additionally, the smart-home speechlet may be configured to determine if the environmental change detected by the sensor at issue is sufficient to identify the device type of the secondary device. For example, when the sensor is a light sensor, the smart-home speechlet may receive the sensor data indicating a degree of light change as detected by the sensor. The smart-home speechlet may determine if the degree of light change satisfies a threshold degree of light change, and if so the smart-home speechlet may determine that the connected device is coupled to a light-emitting device having a "light" device type. Other nonlimiting examples of environmental changes include a degree of sound change as sensed by a microphone satisfying a threshold degree of sound change and/or a degree of temperature change as sensed by a temperature sensor satisfying a threshold degree of temperature change. In these examples, the smart-home speechlet may determine that the connected device is coupled to a speaker or a heater/cooler, respectively.

Additional data may be utilized by the smart-home speechlet to determine the device type of the secondary device and/or to increase a confidence that the selected device type is accurate. For example, naming data associated with the connected device may be utilized. In this example, a user and/or a system may have assigned a naming indicator to the connected device, such as "kitchen light." The inclusion of "light" in the naming indicator may increase a confidence that the device type is a "light" device type. Additionally, or alternatively, when multiple devices are selected to sense an environmental change, the sensor data from each of the multiple devices may be utilized. For example, multiple light sensors may be utilized to detect a change in light level. Also, a microphone may be utilized to detect the sound of a light turning on or off, and that audio data may be utilized to determine the device type.

Additionally, multiple types of sensor data and/or sensor data signals may be utilized to determine an environmental change and/or to determine the device type of the secondary device. For example, audio data and/or lighting data may be utilized. Timing data indicating a time of day and/or particular day of detected environmental changes may be utilized. Temperature data indicating a temperature associated with a given space may be utilized. For example, in an example where a garage door is left open, changes in temperature, lighting, and/or sound may be detected, and depending on the time of day, a user may desire or not desire the garage door to be left open. These and other signals may be utilized to detect the environmental changes described herein.

Once the device type of the secondary device has been determined, a smart-home speechlet may be utilized to generate and send a notification to a user device associated with the connected device. For example, the notification may include information indicating that the system has determined the device type of the secondary device, an indication of that device type, and a request for user input to change the device type of the connected device to the device type of the secondary device. Using the example above, the notification may indicate the system has determined that a light is coupled to the connected device and may request user input switching the plug device type of the connected device to a light device type. The notification may be sent to one or more user devices that are indicated to be associated with the connected device, such as indicated by account data. The notification may include text to be presented on a display of the user device and/or one or more selectable portions to allow for receipt of user input on the user device. The notification may additionally, or alternatively, include audio data and audio corresponding to the audio data may be output by speakers of one or more devices associated with the connected device, such as the voice-controlled devices. In these examples, after output of the notification, an audible response from the user may be provided and analyzed to determine if the device type should be converted as requested. When the input data indicates that the device type conversion should occur, the system may generate data indicating that the connected device is associated with the determined device type in addition to or instead of the prior device type. This data may be stored in association with account data for the connected device.

In other examples, upon determining the device type for the secondary device that is coupled to the connected device, the system may automatically associate the connected device with the determined device type in addition to or instead of the prior device type. A notification of this change may be sent to a user device to confirm that the change should be maintained and/or to allow for user input to not associate the connected device with the determined device type. In examples, automatic association of the connected device with the determined device type may be based at least in part on a confidence level associated with determining the device type, historical data indicating past user behaviors and/or requests associated with the connected device and/or one or more other devices, user input indicating positive reinforcement of the operations described herein, such as a user utterance that includes "thank you," and/or combinations of some or all of these factors.

Additionally, or alternatively, the system for device functionality identification may determine one or more device groups to recommend adding the connected device to. For example, a user may have established a device group that includes multiple connected devices. For at least some device groups, the connected devices associated with a given device group may all have the same or similar device types, such as a light device type. Additionally, or alternatively, a given device group may have a naming indicator that indicates the device type of connected devices in the device group, such as Kitchen Lights. Based at least in part on determining that the device type of a connected device is being changed an accordance with the processes described herein, the system may determine if the connected device is a candidate to be added to a given device group having the same or similar device types. For example, if the system determines that a plug device located in a given environment is to be associated with a light device type utilizing the processes described herein, and the system receives data indicating that other connected devices in the environment with a light device type are associated with a device group, the system may determine that the plug device is a candidate for inclusion in the device group. A notification may be generated and sent to the user device requesting user input for the plug device to be added to the device group, and the plug device may be added based at least in part on the user input.

Additionally, or alternatively, the system may determine one or more other connected devices that are associated with the device type of the connected device prior to conversion of the device type as described herein. For example, if a given connected device was associated with a plug device type and that device type is changed to a light device type based at least in part on the processes described herein, the system may determine one or more other connected devices associated with the account data that also have a plug device type. Having identified those connected devices, the smart-home speechlet may generate and send a notification to the user device indicating the additional connected devices with the plug device type. The notification may request user input indicating whether the user would like to convert those device types to the determined device type, here a light device type for example. The user may provide user input, which may be utilized to convert the device type for the other connected devices as indicated by the user input.

Additionally, or alternatively, the system may determine one or more connected devices that are associated with a predefined routine and may recommend addition of the connected device at issue to the routine. For example, the user and/or the system may have established a routine to be performed in association with connected devices. An example of such a routine may be that multiple connected devices with a light device type turn on when motion is detected. When the device type of a connected device is converted as described herein to a similar device type as connected devices associated with the routine, the system may generate a notification requesting user input indicating whether the connected device at issue should be included in the routine.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates a schematic diagram of an example system 100 for device functionality identification. The system 100 may include, for example, a voice-controlled device 102, a connected device 104, and/or a user device 106. The voice-controlled device 102 may be configured to receive audio representing user utterances and to perform one or more actions associated with the user utterances, including controlling the connected device 104 and/or communicating with the connected device 104 and/or the user device 106. Some of the devices may be "hands free" such that interactions with the devices are performed through audible requests and responses. In other examples, some of the devices may include a display and/or may receive touch input and/or audible input. The voice-controlled devices 102 and the connected devices 104 may be configured to send data to and/or receive data from each other and/or from a remote system 108, such as via a network 110. In examples, the voice-controlled devices 102 and/or the connected devices 104 may communicate directly with the system 108, via the network 1110. Additionally, it should be understood that a given space and/or environment may include numerous devices and need not include the same number and/or type of devices illustrated in FIG. 1. It should also be understood that when a "space" or "environment" is used herein, those terms mean an area and not necessarily a given room, building, or other structure, unless otherwise specifically described as such. In examples, an environment may include an area associated with a local area network.

The voice-controlled device 102 may include one or more components, such as, for example, one or more processors 112, one or more network interfaces 114, memory 116, one or more microphones 118, one or more speakers 120, and/or one or more sensors 122. The microphones 118 may be configured to capture audio, such as user utterances, and generate corresponding audio data. The speakers 120 may be configured to output audio, such as audio corresponding to audio data received from another device and/or the system 108. It should be understood that while several examples used herein include a voice-controlled device 102 that allows users to interact therewith via user utterances, one or more other devices, which may not include a voice interface, may be utilized instead of or in addition to voice-controlled devices 102. In these examples, the device may be configured to send and receive data over the network 110 and to communicate with other devices in the system 100. Additionally, the one or more sensors 122 may include components that allow the voice-controlled device 102 to detect one or more environmental changes associated with the environment in which the voice-controlled device 102 is disposed. Examples of the sensors 122 include, but are not limited to, light sensors such as ambient light sensors, microphones, temperature sensors, an infrared sensor, one or more radar sensors, a motion sensor, a camera, and/or any other device that may sense a change in one or more conditions of an environment.

The connected devices 104 may include one or more components, such as, for example, one or more processors 124, one or more network interfaces 126, and/or memory 128. The memory 128 may include components such as, for example, a device functionality component 130. The memory 128 and/or processors 124 may be utilized to cause certain operations to be performed by the connected devices 104, such as activating and/or deactivating the device functionality 130 of the connected device 104. The device functionality 130 may include components associated with the intended use of the connected devices 104. For example, one of the connected devices 104 may be a light bulb, and in this example, the device functionality components 130 may include a filament and/or light emitting diode that may produce and/or emit light. By way of further example, another connected device 104 may be a wall plug, and in this example, the device functionality components 130 may include an "on/off mechanism" for causing electricity to flow or not flow to a secondary device that is plugged in to the wall plug. It should be noted that the device functionalities illustrated here are by way of example only. It should also be noted that when "electronic devices" are described herein, those electronic device may be the same as or similar to connected devices 104. While the connected device 104 depicted in FIG. 1 is a plug, it should be understood that the connected device 104 may be any connected device or otherwise an Internet-of-things device, such as, for example, a watch, a set top box, a doorbell, a camera, an appliance, a television, a thermostat, a smart plug, a smart light bulb, a clock, a lock, etc. Additionally, in examples, while certain connected devices may be smart-home devices that are associated with a residential environment, the smart devices may include devices other than those found typically in residential environments. For example, the smart devices may include devices found in work or other environments outside of a residence. Such smart devices may include medical equipment, transportation hubs, point-of-sale devices, registers, manufacturing equipment, access-control devices, etc.

The user device 106 may include one or more components, such as, for example, one or more processors 132, one or more network interfaces 134, memory 136, and/or one or more displays 138. The displays 138 may be configured to display media, such as text, corresponding to media data and/or input data that may be received, for example, from the remote system 108. The displays 138 may also be configured to display one or more user interfaces as described herein. The memory 136 may include one or more components such as, for example, one or more applications 140 residing on the memory 136 and/or accessible to the user device 106. The applications(s) 140 may be configured to cause the processor(s) 132 to receive information associated with interactions with the user device 106 and cause display of representations, such as text and/or images, associated with the interactions. The application(s) 140 may also be utilized, in examples, to receive input, such as from a user of the user device 106, and send corresponding data and/or instructions associated with the input to the remote system 108. It should be understood that when user devices are described herein, those user devices may include phones, computers, and/or other computing devices.

The remote system 108 may include components such as, for example, a speech-processing system 142, a smart-home system 144, and/or a user registry 146. It should be understood that while the speech-processing system 142, the smart-home system 144, and/or the user registry 146 are depicted as separate from each other in FIG. 1, some or all of the components may be a part of the same system. The speech-processing system 142 may include an automatic speech recognition component (ASR) 148, a natural language understanding component (NLU) 150, and/or a text-to-speech component (TTS) 152. The smart-home system 144 may include a smart-home speechlet 154, a grouping component 162, and/or a routine component 164. Each of the components described herein with respect to the remote system 108 may be associated with their own systems, which collectively may be referred to herein as the remote system 108, and/or some or all of the components may be associated with a single system. Additionally, the remote system 108 may include one or more applications, which may be described as skills, actions, and/or capsules. For example, a skill may receive data representing an intent. For example, an intent may be determined by the NLU component 150 and/or as determined from user input via a computing device. Skills may be configured to utilize the intent to output data for input to the TTS component 152, a link or other resource locator for audio data, and/or a command to a device, such as the user device 106.

In instances where a user device 106 is utilized, skills may extend the functionality of connected devices 104 that can be controlled by users utilizing a voice-user interface. In some examples, skills may be a type of application that may be useable in association with connected devices 104 and may have been developed specifically to work in connection with given connected devices 104. Additionally, skills may be a type of application that may be useable in association with an electronic device and may have been developed specifically to provide given functionality to the electronic device. In examples, a non-skill application may be an application that does not include the functionality of a skill. Speechlets, as described herein, may be a type of application that may be usable in association with electronic devices and may have been developed specifically to work in connection voice interfaces of with electronic devices. The application(s) may be configured to cause processor(s) to receive information associated with interactions with the user device 106. The application(s) may also be utilized, in examples, to receive input, such as from a user of the user device 106, and send data and/or instructions associated with the input to one or more other devices.

The components of the remote system 108 are described in detail below. In examples, some or each of the components of the remote system 108 may include their own processor(s), network interface(s), and/or memory. As such, by way of example, the speech-processing system 142 may include and/or be associated with processor(s), network interface(s), and/or memory. The smart-home system 144 may include and/or be associated with different processor(s), network interface(s), and/or memory, or one or more of these components may utilize some or all of the same processor(s), network interface(s), and/or memory utilized by the speech-processing system 142. These components are described in detail below. Additionally, the operations and/or functionalities associated with and/or described with respect to the components of the remote system 108 may be performed utilizing cloud-based computing resources. For example, web-based systems such as Elastic Compute Cloud systems or similar systems may be utilized to generate and/or present a virtual computing environment for performance of some or all of the functionality described herein. Additionally, or alternatively, one or more systems that may be configured to perform operations without provisioning and/or managing servers, such as a Lambda system or similar system, may be utilized.

The user registry component 146 may be configured to identify, determine, and/or generate associations between users, user accounts, and/or devices. For example, one or more associations between user accounts may be identified, determined, and/or generated by the user registry 146. The user registry 146 may additionally store information indicating one or more applications and/or resources accessible to and/or enabled for a given user account. Additionally, the user registry 146 may include information indicating device identifiers, such as naming identifiers, associated with a given user account, as well as device types associated with the device identifiers. The user registry 146 may also include information indicating user account identifiers, naming indicators of devices associated with user accounts, and/or associations between devices, such as the voice-controlled device 102, the connected device 104, and/or the user device 106. The user registry 146 may also include information associated with usage of the connected devices 104 and/or the voice-controlled devices 102. It should also be understood that a user account may be associated with one or more than one user profiles. It should also be understood that the term "user account" may be used to describe a set of data and/or functionalities associated with a given account identifier. For example, data identified, determined, and/or generated while using some or all of the system 100 may be stored or otherwise associated with an account identifier. Data associated with the user accounts may include, for example, account access information, historical usage data, device-association data, and/or preference data.

To perform the device functionality identification operations described herein, for example, a user may request that the state of the connected device 104 be changed. This request may, for example, be an audible request such as "turn Plug 1 on." The voice-controlled device 102 may capture audio representing the audible request and may generate corresponding audio data. The audio data may be sent to the speech-processing system 142 to generate intent data representing the request to operate the connected device 104. For example, the ASR component 148 may generate text data that corresponds to the audio data, and the NLU component 150 may generate intent data based at least in part on the text data. The speech-processing system 142 may determine that the request is associated with smart-home functionality and may send the intent data to the smart-home system 144 to handle responding to the request.

The smart-home speechlet 154 of the smart-home system 144 may receive the intent data and may determine one or more applications, which may in examples be described herein as skills, that are configured to handle the given intent. The applications may be utilized to communicate the request with a system associated with the connected device 104 and to receive a response from the system. For example, the smart-home speechlet 154 may determine that "Plug 1" is associated with a given application and may request that the application and/or the system associated with the connected device 104 take an action on the connected device that corresponds to the request, here turning Plug 1 on. In this example or in other examples, the smart-home speechlet 154 may generate directive data representing a directive to control the connected device 104. The directive data may be sent to the voice-controlled device 102 and/or to the connected device 104, which may cause the connected device 104 to be operated. By way of illustration, the operation may be to turn on Plug 1, which may allow electricity to flow from the outlet, through Plug 1, and to a secondary device 170 that is plugged in to Plug 1. For ease of illustration and not by way of limitation, the secondary device 170 may be, for example, a light emitting device such as a lamp. In this example, operating Plug 1 as described above may cause the secondary device 170 to emit light.

In addition to operating the connected device 104, one or more operations may be performed to determine the device type of the secondary device 170. For example, the smart-home system 144, having received the intent data from the speech-processing system 142, may utilize the intent data and/or other data associated with the user request to determine account data associated with the voice-controlled device 102 from which the audio data was received. The smart-home speechlet 154 may utilize the account data, which may be received from the user registry 146, to determine which connected devices 104 are associated with the voice-controlled device 102 and the device types of those devices. With respect to a given request to operate a connected device 104, the smart-home speechlet 154 may identify the device identifier of the connected device 104 to be operated and may identify the device type associated with that device identifier. In the example provided herein, the smart-home speechlet 154 may identify the device identifier for Plug 1 and may identify the device type as a plug device. Having identified the connected device 104 as being associated with a predefined device type, here a plug device type by way of example, the smart-home speechlet 154 may initiate a process for determining the device type of the secondary device 170. For example, the smart-home speechlet 154 may select a device to be utilized to sense an environmental change in the environment in which the devices at issue are disposed.

The smart-home speechlet 154 may be configured to determine which devices in the environment are configured with one or more environmental sensors 122 and/or may be configured to determine which device or devices are to be utilized to sense an environmental change utilizing the environmental sensor(s). For example, the account data may include data indicating which devices are associated with the connected device 104 and the hardware configuration(s) of those devices. A given device may be considered a candidate device for selection when, for example, that device includes an environmental sensor 122 as indicated from the account data. Examples of environmental sensors may include, for example, a light sensor such as an ambient light sensor, a microphone, a temperature sensor, an infrared sensor, one or more radar sensors, a motion sensor, a camera, and/or any other device that may sense a change in one or more conditions of an environment. In addition to identifying one or more candidate devices that include an environmental sensor 122, the smart-home speechlet 154 may select one or more of the candidate devices to receive sensor data from. For example, given account data may indicate that a given environment includes multiple voice-controlled devices 102 that have an ambient light sensor. The smart-home speechlet 154 may also be configured to receive data associated with locations of the various voice-controlled devices 102 and may utilize that data to determine which voice-controlled device(s) 102 are closest to the connected device 104 and/or that are otherwise positioned to detect an environmental change caused by operation of the connected device 104. The data associated with locations of devices may include, for example, spatial-perception data indicating distance between devices as determined from time-of-flight information, device-affinity data indicating which voice-controlled devices 102 communicate most frequently with given connected devices 104, naming data indicating friendly names associated with voice-controlled device 102 and/or connected devices 104, device-usage data indicating how voice-controlled devices 102 and/or connected devices 104 have been historically utilized, and/or user-setting data indicating configuration of the voice-controlled devices 102 and/or connected devices 104 by a user of the devices, for example. Utilizing the example provided above, the smart-home speechlet 154 may identify a voice-controlled device 102 that has an ambient light sensor 122 and that is located in the same room as the connected device 104 to be operated as the device from which to receive sensor data. It should be understood that while this example illustrates selection of one device from which to receive sensor data, more than one device may be selected. Additionally, while the example device includes an ambient light sensor, it should be understood that the selected device(s) may include an additional and/or different environmental sensor.

The smart-home speechlet 154 may then generate and send a command to the selected device to, in examples, activate the sensor 122 and/or to instruct the device to send sensor data as generated by the sensor 122. Selection of a device and sending of the command to the selected device to provide sensor data may be performed prior to operation of the connected device 104, as described above. In this way, a device may be selected and the sensor 122 of the device may be activated prior to the connected device 104 being operated. As such, when the connected device 104 is operated, a change to one or more conditions of the environment caused by operation of the connected device 104 may be detected by the sensor 122 of the selected device. It should be understood that while the selected device is depicted and described herein by way of example as the voice-controlled device 102, the selected device may be any device that includes a sensor and/or may be just a sensor itself. Utilizing the example provided above, the ambient light sensor 122 of the selected voice-controlled device 102 may be activated and/or may be transitioned to a state where sensor data is being generated. Thereafter, the command to operate the connected device 104 may be sent to the connected device, which may cause the connected device 104, in this example, to turn on. In other examples, the command to operate the connected device 104 may be sent regardless of when the command associated with the sensor 122 is sent. In this example, timing data associated with when commands are sent may be generated and utilized to determine when environmental changes occur based at least in part on operation of the connected device 104. By turning on, the light-emitting device 170 that is plugged in to the connected device 104 may start emitting light into the environment in which the connected device 104 is situated. The ambient light sensor 122, which is sensing light levels in the environment, may detect the change in light level caused by the light-emitting device 170 emitting light. For example, the ambient light sensor 122 may be configured to sense lumens and may detect an increase in lumens when the connected device 104 is operated. Sensor data indicating this increase in lumens may be generated and may be sent, for example, to a smart-home speechlet 154.

The smart-home speechlet 154 may receive the sensor data as well as state-change data indicating the state change of the connected device 104. In examples, the sensor data and the state-change data may be timestamped such that the smart-home speechlet 154 is configured to determine that a given environmental change as detected by a device sensor 122 correlates to a given state change of a connected device 104. Additionally, the smart-home speechlet 154 may be configured to determine if the environmental change detected by the sensor 122 at issue is sufficient to identify the device type of the secondary device 170. For example, when the sensor 122 is a light sensor, the smart-home speechlet 154 may receive the sensor data indicating a degree of light change as detected by the sensor 122. The smart-home speechlet 154 may determine if the degree of light change satisfies a threshold degree of light change, and if so the smart-home speechlet 154 may determine that the connected device 104 is coupled to a light-emitting device 170 having a "light" device type. Other non-limiting examples of environmental changes include a degree of sound change as sensed by a microphone 118 satisfying a threshold degree of sound change and/or a degree of temperature change as sensed by a temperature sensor 122 satisfying a threshold degree of temperature change. In these examples, the smart-home speechlet 154 may determine that the connected device 104 is coupled to a speaker or a heater/cooler, respectively.

Additional data may be utilized by the smart-home speechlet 154 to determine the device type of the secondary device 170 and/or to increase a confidence that the selected device type is accurate. For example, naming data associated with the connected device 104 may be utilized. In this example, a user and/or a system may have assigned a naming indicator to the connected device 104, such as "kitchen light." The inclusion of "light" in the naming indicator may increase a confidence that the device type is a "light" device type. Additionally, or alternatively, when multiple devices are selected to sense an environmental change, the sensor data from each of the multiple devices may be utilized. For example, multiple light sensors 122 may be utilized to detect a change in light level. Also, a microphone 118 may be utilized to detect the sound of a light turning on or off, and that audio data may be utilized to determine the device type.

Additionally, multiple types of sensor data and/or sensor data signals may be utilized to determine an environmental change and/or to determine the device type of the secondary device. For example, audio data and/or lighting data may be utilized. Timing data indicating a time of day and/or particular day of detected environmental changes may be utilized. Temperature data indicating a temperature associated with a given space may be utilized. For example, in an example where a garage door is left open, changes in temperature, lighting, and/or sound may be detected, and depending on the time of day, a user may desire or not desire the garage door to be left open. These and other signals may be utilized to detect the environmental changes described herein.

Once the device type of the secondary device 170 has been determined, a smart-home speechlet 154 may be utilized to generate and send a notification to a user device 106 associated with the connected device 104. For example, the notification may include information indicating that the system has determined the device type of the secondary device 170, an indication of that device type, and a request for user input to change the device type of the connected device 104 to the device type of the secondary device 170. Using the example above, the notification may indicate the system has determined that a light is coupled to the connected device 104 and may request user input switching the plug device type of the connected device 104 to a light device type. The notification may be sent to one or more user devices 106 that are indicated to be associated with the connected device 104, such as indicated by account data. The notification may include text to be presented on a display of the user device 106 and/or one or more selectable portions to allow for receipt of user input on the user device 106. The notification may additionally, or alternatively, include audio data and audio corresponding to the audio data may be output by speakers 120 of one or more devices associated with the connected device 104, such as the voice-controlled devices 102. In these examples, after output of the notification, an audible response from the user may be provided and analyzed to determine if the device type should be converted as requested. When the input data indicates that the device type conversion should occur, the system may generate data indicating that the connected device 104 is associated with the determined device type in addition to or instead of the prior device type. This data may be stored in association with account data for the connected device 104.

In other examples, upon determining the device type for the secondary device 170 that is coupled to the connected device 104, the system may automatically associate the connected device 104 with the determined device type in addition to or instead of the prior device type. A notification of this change may be sent to a user device 106 to confirm that the change should be maintained and/or to provide user input to not associate the connected device 104 with the determined device type. In examples, automatic association of the connected device 104 with the determined device type may be based at least in part on a confidence level associated with determining the device type, historical data indicating past user behaviors and/or requests associated with the connected device 104 and/or one or more other devices, user input indicating positive reinforcement of the operations described herein, such as a user utterance that includes "thank you," and/or combinations of some or all of these factors.

Additionally, or alternatively, the system for device functionality identification may determine one or more device groups to recommend adding the connected device to. For example, a user may have established a device group that includes multiple connected devices. For at least some device groups, the connected devices associated with a given device group may all have the same or similar device types, such as a light device type. Additionally, or alternatively, a given device group may have a naming indicator that indicates the device type of connected devices in the device group, such as Kitchen Lights. The grouping component 162, based at least in part on determining that the device type of a connected device 104 is being changed an accordance with the processes described herein, may determine if the connected device 104 should be added to a given device group having the same or similar device types. For example, if the grouping component 162 determines that a plug device located in a given environment is to be associated with a light device type utilizing the processes described herein, and the grouping component 162 receives data indicating that other connected devices in the environment with a light device type are associated with a device group, the grouping component 162 may determine that the plug device is a candidate for inclusion in the device group.

A notification may be generated and sent to the user device 106 requesting user input for the plug device to be added to the device group, and the plug device may be added based at least in part on the user input.

Additionally, or alternatively, the system may determine one or more other connected devices that are associated with the device type of the connected device prior to conversion of the device type as described herein. For example, if a given connected device was associated with a plug device type and that device type is changed to a light device type based at least in part on the processes described herein, the smart-home speechlet 154 may determine one or more other connected devices associated with the account data that are also associated with a plug device type. Having identified those connected devices, the smart-home speechlet 154 may generate and send a notification to the user device 106 indicating the additional connected devices with the plug device type. The notification may also request user input indicating whether the user would like to convert those device types to the determined device type, here a light device type for example. The user may provide user input, which may be utilized to convert the device type for the other connected devices as indicated by the user input.

The routine component 164 may determine one or more connected devices that are associated with a predefined routine and may recommend addition of the connected device at issue to the routine. For example, the user and/or the system may have established a routine to be performed in association with connected devices. An example of such a routine may be that multiple connected devices with a light device type turn on when motion is detected. When the device type of a connected device 104 is converted as described herein to a similar device type as connected devices associated with a routine, the smart-home speechlet 154 may generate a notification requesting user input indicating whether the connected device at issue should be included in the routine.

As shown in FIG. 1, several of the components of the remote system 104 and the associated functionality of those components as described herein may be performed by the voice-controlled device 102, the connected device 104, and/or the user device 106. Additionally, or alternatively, some or all of the components and/or functionalities associated with the voice-controlled device 102, the connected device 104, and/or the user device 106 may be performed by the remote system 108.

It should be noted that the exchange of data and/or information as described herein, and/or the performance of operations as described herein, may be performed only in situations where a user has provided consent for the exchange of such information and/or performance of such operations. For example, upon setup of devices and/or initiation of applications, a user may be provided with the opportunity to opt in and/or opt out of data exchanges between devices and/or with the polling system and/or for performance of the functionalities described herein. Additionally, when one of the devices is associated with a first user account and another of the devices is associated with a second user account, user consent may be obtained before performing some, any, or all of the operations and/or processes described herein. Additionally, the operations performed by the components of the systems described herein may be performed only in situations where a user has provided consent for performance of the operations.

As used herein, a processor, such as processor(s) 112, 124, 132, and/or the processor(s) described with respect to the components of the remote system 108, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 112, 124, 132, and/or the processor(s) described with respect to the components of the remote system 108 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 112, 124, 132, and/or the processor(s) described with respect to the components of the remote system 108 may possess its own local memory, which also may store program components, program data, and/or one or more operating systems.

The memory 116, 128, 136, and/or the memory described with respect to the components of the remote system 108 may include volatile and nonvolatile memory, removable and non-removable media implemented in any method or technology for storage of information, such as computer-readable instructions, data structures, program component, or other data. Such memory 116, 128, 136, and/or the memory described with respect to the components of the remote system 108 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 116, 128, 136, and/or the memory described with respect to the components of the remote system 108 may be implemented as computer-readable storage media ("CRSM"), which may be any available physical media accessible by the processor(s) 112, 124, 132, and/or the processor(s) described with respect to the remote system 108 to execute instructions stored on the memory 116, 128, 136, and/or the memory described with respect to the components of the remote system 108. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as memory 116, 128, 136, and/or the memory described with respect to the components of the remote system 108, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the Free-BSD operating system as promulgated by the FreeBSD Project; other UNIX or UNIX-like variants; a variation of the Linux operating system as promulgated by Linus Torvalds; the FireOS operating system from Amazon.com Inc. of Seattle, Washington, USA; the Windows operating system from Microsoft Corporation of Redmond, Washington, USA; LynxOS as promulgated by Lynx Software Technologies, Inc. of San Jose, California; Operating System Embedded (Enea OSE) as promulgated by ENEA AB of Sweden; and so forth.

The network interface(s) 114, 126, 134, and/or the network interface(s) described with respect to the components of the remote system 108 may enable messages between the components and/or devices shown in system 100 and/or with one or more other polling systems, as well as other networked devices. Such network interface(s) 114, 126, 134, and/or the network interface(s) described with respect to the components of the remote system 108 may include one or more network interface controllers (NICs) or other types of transceiver devices to send and receive messages over the network 110.

For instance, each of the network interface(s) 114, 126, 134, and/or the network interface(s) described with respect to the components of the remote system 108 may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) 114, 126, 134, and/or the network interface(s) described with respect to the components of the remote system 108 may include a wide area network (WAN) component to enable message over a wide area network.

In some instances, the remote system 108 may be local to an environment associated the voice-controlled devices 102. For instance, the remote system 108 may be located within one or more of the voice-controlled devices 102. In some instances, some or all of the functionality of the remote system 108 may be performed by one or more of the voice-controlled devices 102. Also, while various components of the remote system 108 have been labeled and named in this disclosure and each component has been described as being configured to cause the processor(s) to perform certain operations, it should be understood that the described operations may be performed by some or all of the components and/or other components not specifically illustrated.

Figure 2:
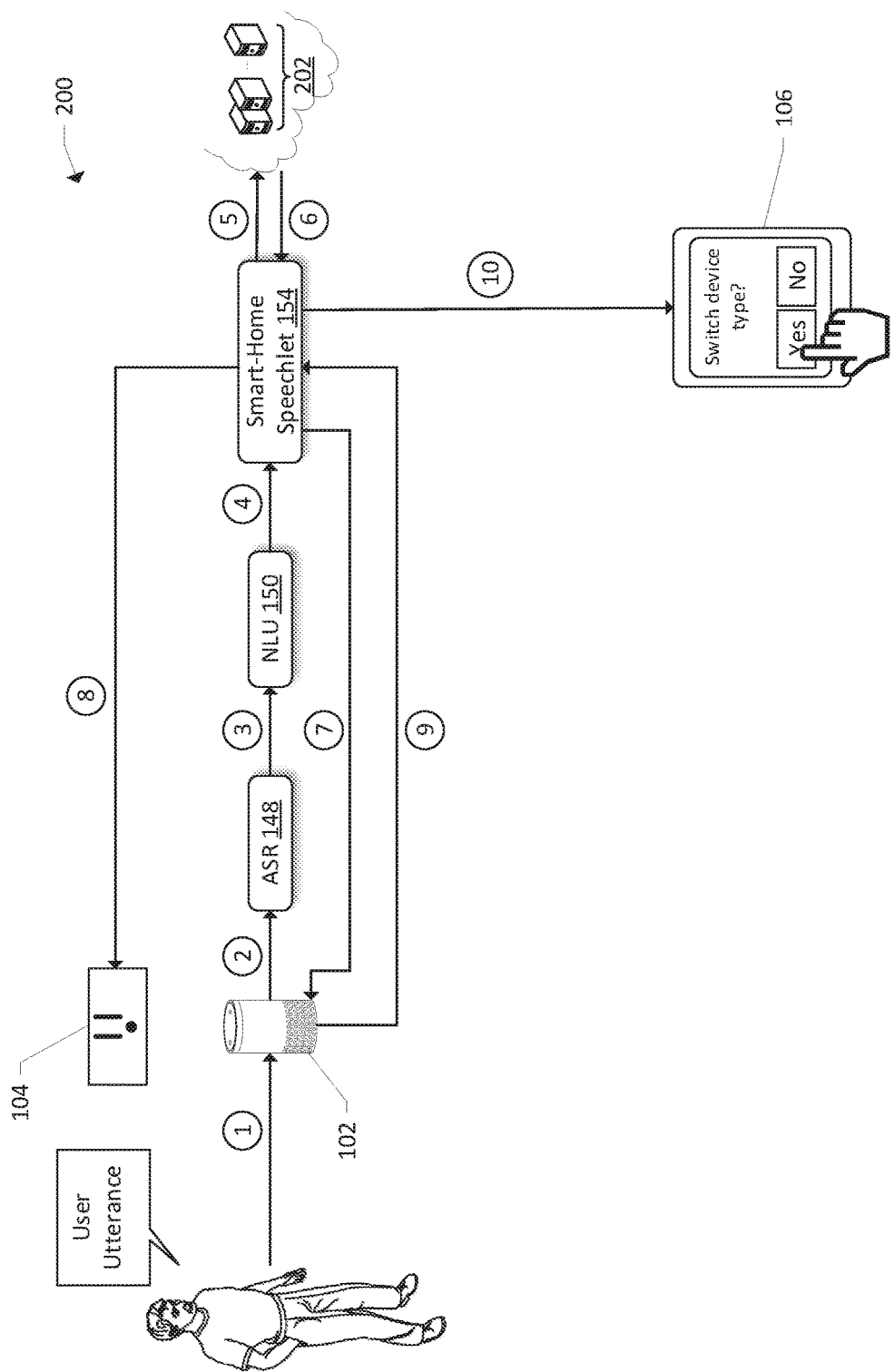
FIG. 2 illustrates a conceptual diagram of example components of a system for device functionality identification.

FIG. 2 illustrates a conceptual diagram of example components of a system 200 for device functionality identification. The system 200 may include the same or similar components to the system 100 described with respect to FIG. 1. For example, the system 200 may include a voice-controlled device 102, a connected device 104, a user device 106, and one or more components of a remote system, such as an ASR component 148, an NLU component 150, and/or a smart-home speechlet 154. It should be understood that while operations performed in association with the system 200 are described herein in steps 1-12, additional or different steps may be included and the steps 1-12 need not be performed in sequential order or in the order described by way of example in FIG. 2.

At step 1, a user may request that the state of the connected device 104 be changed. This request may, for example, be an audible request such as "turn Plug 1 on." The voice-controlled device 102 may capture audio representing the audible request and may generate corresponding audio data.

At step 2, the audio data may be sent to a speech-processing system to generate intent data representing the request to operate the connected device 104. For example, the ASR component 148 may, at step 3, generate text data that corresponds to the audio data, and the NLU component 150, at step 4, may generate intent data based at least in part on the text data. The speech-processing system may determine that the request is associated with smart-home functionality and may send the intent data to the smart-home system, such as via the smart-home speechlet 154, to handle responding to the request. In other examples, a state change of the device may be requested without a voice request and instead may be from a user providing user input to the voice-controlled device 102, the user device 106, and/or the connected device 104.

At step 5, the smart-home speechlet 154 may receive the intent data and may determine one or more applications, which may in examples be described herein as skills, that are configured to handle the given intent. The applications may be utilized to communicate the request with a system 202 associated with the connected device 104 and to receive a response from the system. For example, the smart-home speechlet 154 may determine that "Plug 1" is associated with a given application and may request that the application and/or the system 202 associated with the connected device 104 take an action on the connected device 104 that corresponds to the request, here turning Plug 1 on. At step 6, the system 202 associated with the connected device 104 may return data to the smart-home speechlet 154 to respond to the user request, such data may include an identifier of the connected device 104, information for generating a command for operating the connected device 104, and/or TTS data for output of a response to the request, such as "okay" or "Plug 1 on." It should be understood that the system 202 may be utilized in situations where data is to be provided by a remote system to respond to a user utterance and/or in situations where state-change data is to be received from the remote system 202. It should be understood that, in examples, instead of performing the operations described with respect to steps 2-6, input data other than speech input may be received to request operation of the connected device 104. For example, the input data may correspond to input from an application residing on a user device, input from the connected device 104 itself, and/or data from a remote system associated with the connected device.

At step 7, the smart-home speechlet 154, having received the intent data from the NLU component 150, may utilize the intent data and/or other data associated with the user request to determine account data associated with the voice-controlled device 102 from which the audio data was received. The smart-home speechlet 154 may utilize the account data, which may be received from the user registry, to determine which connected devices 104 are associated with the voice-controlled device 102 and the device types of those devices. With respect to a given request to operate a connected device 104, the smart-home speechlet 154 may identify the device identifier of the connected device 104 to be operated and may identify the device type associated with that device identifier. In the example provided herein, the smart-home speechlet 154 may identify the device identifier for Plug 1 and may identify the device type as a plug device. Having identified the connected device 104 as being associated with a predefined device type, here a plug device type by way of example, the smart-home speechlet 154 may initiate a process for determining the device type of the secondary device. For example, the smart-home speechlet 154 may select a device to be utilized to sense an environmental change in the environment in which the devices at issue are disposed.

The smart-home speechlet 154 may be configured to determine which devices in the environment are configured with one or more environmental sensors and/or may be configured to determine which device or devices are to be utilized to sense an environmental change utilizing the environmental sensor(s). For example, the account data may include data indicating which devices are associated with the connected device 104 and the hardware configuration(s) of those devices. A given device may be considered a candidate device for selection when, for example, that device includes an environmental sensor as indicated from the account data. Examples of environmental sensors may include, for example, a light sensor such as an ambient light sensor, a microphone, a temperature sensor, an infrared sensor, one or more radar sensors, a motion sensor, a camera, and/or any other device that may sense a change in one or more conditions of an environment. In addition to identifying one or more candidate devices that include an environmental sensor, the smart-home speechlet 154 may select one or more of the candidate devices to receive sensor data from. For example, given account data may indicate that a given environment includes multiple voice-controlled devices 102 that have an ambient light sensor. The smart-home speechlet 154 may also be configured to receive data associated with locations of the various voice-controlled devices 102 and may utilize that data to determine which voice-controlled device(s) 102 are closest to the connected device 104 and/or that are otherwise positioned to detect an environmental change caused by operation of the connected device 104. The data associated with locations of devices may include, for example, spatial-perception data indicating distance between devices as determined from time-of-flight information, device-affinity data indicating which voice-controlled devices 102 communicate most frequently with given connected devices 104, naming data indicating friendly names associated with voice-controlled device 102 and/or connected devices 104, device-usage data indicating how voice-controlled devices 102 and/or connected devices 104 have been historically utilized, and/or user-setting data indicating configuration of the voice-controlled devices 102 and/or connected devices 104 by a user of the devices, for example. Utilizing the example provided above, the smart-home speechlet 154 may identify a voice-controlled device 102 that has an ambient light sensor and that is located in the same room as the connected device 104 to be operated as the device from which to receive sensor data. It should be understood that while this example illustrates selection of one device from which to receive sensor data, more than one device may be selected. Additionally, while the example device includes an ambient light sensor, it should be understood that the selected device(s) may include an additional and/or different environmental sensor. In examples, the system may determine which device have environmental sensors and/or a certain type of environmental sensor and may select all such devices to sense the environmental change.

The smart-home speechlet 154 may then generate and send a command to the selected device(s) to, in examples, activate the sensor and/or to instruct the device to send sensor data as generated by the sensor. Selection of a device and sending of the command to the selected device to provide sensor data may be performed prior to operation of the connected device 104, as described above. In this way, a device may be selected and the sensor of the device may be activated prior to the connected device 104 being operated. As such, when the connected device 104 is operated, a change to one or more conditions of the environment caused by operation of the connected device 104 may be detected by the sensor of the selected device. It should be understood that while the selected device is depicted and described herein by way of example as the voice-controlled device 102, the selected device may be any device that includes a sensor and/or may be just a sensor itself. Utilizing the example provided above, the ambient light sensor of the selected voice-controlled device 102 may be activated and/or may be transitioned to a state where sensor data is being generated. Thereafter, the command to operate the connected device 104 may be sent to the connected device, which may cause the connected device 104, in this example, to turn on. In other examples, the command to operate the connected device 104 may be sent regardless of when the command associated with the sensor is sent. In this example, timing data associated with when commands are sent may be generated and utilized to determine when environmental changes occur based at least in part on operation of the connected device 104. By turning on, the light-emitting device that is plugged in to the connected device 104 may start emitting light into the environment in which the connected device 104 is situated.

At step 8, the smart-home speechlet 154 may generate directive data representing a directive to control the connected device 104. The directive data may be sent to the voice-controlled device 102 and/or to the connected device 104, which may cause the connected device 104 to be operated. By way of illustration, the operation may be to turn on Plug 1, which may allow electricity to flow from the outlet, through Plug 1, and to a secondary device that is plugged in to Plug 1. For ease of illustration and not by way of limitation, the secondary device may be, for example, a light emitting device such as a lamp. In this example, operating Plug 1 as described above may cause the secondary device to emit light.

At step 9, the ambient light sensor, which is sensing light levels in the environment, may detect the change in light level caused by the light-emitting device emitting light. For example, the ambient light sensor may be configured to sense lumens and may detect an increase in lumens when the connected device 104 is operated. Sensor data indicating this increase in lumens may be generated and may be sent, for example, to the smart-home speechlet 154.

At step 10, the smart-home speechlet 154 may receive the sensor data as well as state-change data indicating the state change of the connected device 104. In examples, the sensor data and the state-change data may be timestamped such that the smart-home speechlet 154 is configured to determine that a given environmental change as detected by a device sensor correlates to a given state change of a connected device 104. Additionally, the smart-home speechlet 154 may be configured to determine if the environmental change detected by the sensor at issue is sufficient to identify the device type of the secondary device. For example, when the sensor is a light sensor, the smart-home speechlet 154 may receive the sensor data indicating a degree of light change as detected by the sensor. The smart-home speechlet 154 may determine if the degree of light change satisfies a threshold degree of light change, and if so the smart-home speechlet 154 may determine that the connected device 104 is coupled to a light-emitting device having a "light" device type. Other nonlimiting examples of environmental changes include a degree of sound change as sensed by a microphone satisfying a threshold degree of sound change and/or a degree of temperature change as sensed by a temperature sensor satisfying a threshold degree of temperature change. In these examples, the smart-home speechlet 154 may determine that the connected device 104 is coupled to a speaker or a heater/cooler, respectively.

Additional data may be utilized by the smart-home speechlet 154 to determine the device type of the secondary device and/or to increase a confidence that the selected device type is accurate. For example, naming data associated with the connected device 104 may be utilized. In this example, a user and/or a system may have assigned a naming indicator to the connected device 104, such as "kitchen light." The inclusion of "light" in the naming indicator may increase a confidence that the device type is a "light" device type. Additionally, or alternatively, when multiple devices are selected to sense an environmental change, the sensor data from each of the multiple devices may be utilized. For example, multiple light sensors may be utilized to detect a change in light level. Also, a microphone may be utilized to detect the sound of a light turning on or off, and that audio data may be utilized to determine the device type.

Once the device type of the secondary device has been determined, the smart-home speechlet 154 may be utilized to generate and send a notification to a user device 106 associated with the connected device 104. For example, the notification may include information indicating that the system has determined the device type of the secondary device, an indication of that device type, and a request for user input to change the device type of the connected device 104 to the device type of the secondary device. Using the example above, the notification may indicate the system has determined that a light is coupled to the connected device 104 and may request user input switching the plug device type of the connected device 104 to a light device type. The notification may be sent to one or more user devices 106 that are indicated to be associated with the connected device 104, such as indicated by account data. The notification may include text to be presented on a display of the user device 106 and/or one or more selectable portions to allow for receipt of user input on the user device 106. The notification may additionally, or alternatively, include audio data and audio corresponding to the audio data may be output by speakers 120 of one or more devices associated with the connected device 104, such as the voice-controlled devices 102. In these examples, after output of the notification, an audible response from the user may be provided and analyzed to determine if the device type should be converted as requested. When the input data indicates that the device type conversion should occur, the system may generate data indicating that the connected device 104 is associated with the determined device type in addition to or instead of the prior device type. This data may be stored in association with account data for the connected device 104.

In other examples, upon determining the device type for the secondary device that is coupled to the connected device 104, the system may automatically associate the connected device 104 with the determined device type in addition to or instead of the prior device type. A notification of this change may be sent to a user device 106 to confirm that the change should be maintained and/or to provide user input to not associate the connected device 104 with the determined device type. In examples, automatic association of the connected device 104 with the determined device type may be based at least in part on a confidence level associated with determining the device type, historical data indicating past user behaviors and/or requests associated with the connected device 104 and/or one or more other devices, user input indicating positive reinforcement of the operations described herein, such as a user utterance that includes "thank you," and/or combinations of some or all of these factors.

Figure 3:
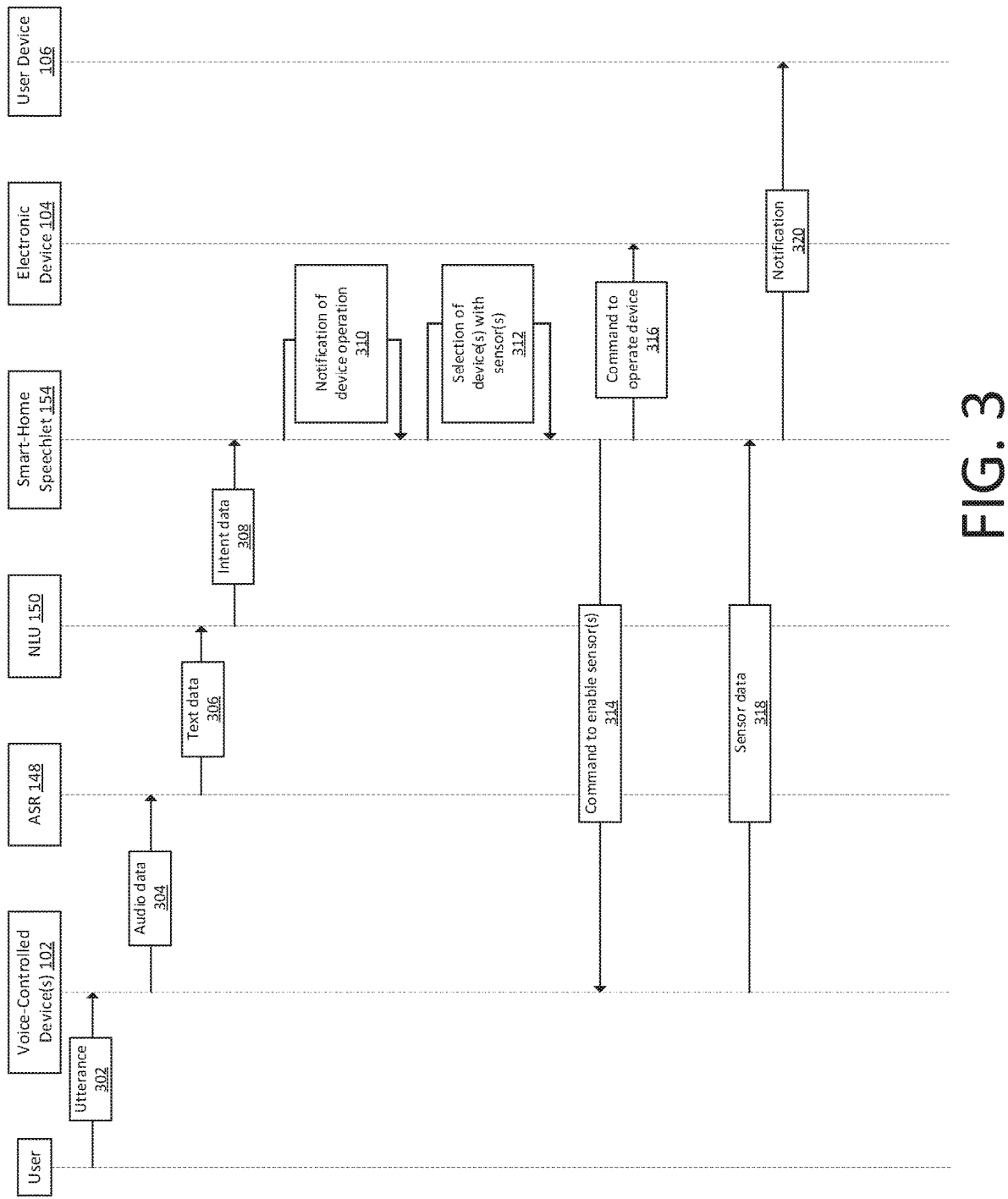
FIG. 3 illustrates a sequence diagram showing operations performed by example components of a system for device functionality identification.

FIG. 3 illustrates a sequence diagram 300 showing operations performed by example components of a system for device functionality identification. It should be understood that while the sequence diagram 300 is described in a stepwise manner, some or all of the operations described with respect to FIG. 3 may be performed in a different order and/or in parallel.

At block 302, a user may request that the state of a connected device 104 be changed. This request may, for example, be an audible request such as "turn Plug 1 on." A voice-controlled device 102 may capture audio representing the audible request and may generate corresponding audio data.

At block 304, the audio data may be sent to a speech-processing system to generate intent data representing the request to operate the connected device 104. For example, an ASR component 148 may, at block 306, generate text data that corresponds to the audio data, and an NLU component 150, at block 308, may generate intent data based at least in part on the text data. In examples, the intent data may be generated based at least in part on the audio data without the generation of text data. The speech-processing system may determine that the request is associated with smart-home functionality and may send the intent data to the smart-home system, such as via the smart-home speechlet 154, to handle responding to the request. In other examples, a state change of the device may be requested without a voice request and instead may be from a user providing user input to the voice-controlled device 102, a user device 106, and/or the connected device 104.

In addition to operating the connected device 104, one or more operations may be performed to determine the device type of the secondary device. For example, the smart-home speechlet 154, having received the intent data from the NLU component 150, may utilize the intent data and/or other data associated with the user request to determine account data associated with the voice-controlled device 102 from which the audio data was received. The smart-home speechlet 154 may utilize the account data, which may be received from the user registry, to determine which connected devices 104 are associated with the voice-controlled device 102 and the device types of those devices. With respect to a given request to operate a connected device 104, the smart-home speechlet 154 may identify the device identifier of the connected device 104 to be operated and may identify the device type associated with that device identifier. In the example provided herein, the smart-home speechlet 154 may identify the device identifier for Plug 1 and may identify the device type as a plug device. Having identified the connected device 104 as being associated with a predefined device type, here a plug device type by way of example, the smart-home speechlet 154 may initiate a process for determining the device type of the secondary device. For example, the smart-home speechlet 154 may select a device to be utilized to sense an environmental change in the environment in which the devices at issue are disposed.

The smart-home speechlet 154, at block 310, may generate a notification of the request to operate a given device. The smart-home speechlet 154 may be configured to determine which devices in the environment are configured with one or more environmental sensors and/or may be configured to determine which device or devices are to be utilized to sense an environmental change utilizing the environmental sensor(s). For example, the account data may include data indicating which devices are associated with the connected device 104 and the hardware configuration(s) of those devices. A given device may be considered a candidate device for selection when, for example, that device includes an environmental sensor as indicated from the account data. Examples of environmental sensors may include, for example, a light sensor such as an ambient light sensor, a microphone, a temperature sensor, an infrared sensor, one or more radar sensors, a motion sensor, a camera, and/or any other device that may sense a change in one or more conditions of an environment.

In addition to identifying one or more candidate devices that include an environmental sensor, the smart-home speechlet 154 may, at block 312, select one or more of the candidate devices to receive sensor data from. For example, given account data may indicate that a given environment includes multiple voice-controlled devices 102 that have an ambient light sensor. The smart-home speechlet 154 may also be configured to receive data associated with locations of the various voice-controlled devices 102 and may utilize that data to determine which voice-controlled device(s) 102 are closest to the connected device 104 and/or that are otherwise positioned to detect an environmental change caused by operation of the connected device 104. The data associated with locations of devices may include, for example, spatial-perception data indicating distance between devices as determined from time-of-flight information, device-affinity data indicating which voice-controlled devices 102 communicate most frequently with given connected devices 104, naming data indicating friendly names associated with voice-controlled device 102 and/or connected devices 104, device-usage data indicating how voice-controlled devices 102 and/or connected devices 104 have been historically utilized, and/or user-setting data indicating configuration of the voice-controlled devices 102 and/or connected devices 104 by a user of the devices, for example. Utilizing the example provided above, the smart-home speechlet 154 may identify a voice-controlled device 102 that has an ambient light sensor and that is located in the same room as the connected device 104 to be operated as the device from which to receive sensor data. It should be understood that while this example illustrates selection of one device from which to receive sensor data, more than one device may be selected. Additionally, while the example device includes an ambient light sensor, it should be understood that the selected device(s) may include an additional and/or different environmental sensor.

At block 314, the smart-home speechlet 154 may generate and send a command to the selected device to, in examples, activate the sensor and/or to instruct the device to send sensor data as generated by the sensor. It should be understood that the selected device may be the voice-controlled device and/or another voice-controlled device and/or a device without a voice interface. Selection of a device and sending of the command to the selected device to provide sensor data may be performed prior to operation of the connected device 104, as described herein. In this way, a device may be selected and the sensor of the device may be activated prior to the connected device 104 being operated. As such, when the connected device 104 is operated, a change to one or more conditions of the environment caused by operation of the connected device 104 may be detected by the sensor of the selected device. It should be understood that while the selected device is depicted and described herein by way of example as the voice-controlled device 102, the selected device may be any device that includes a sensor and/or may be just a sensor itself. Utilizing the example provided above, the ambient light sensor of the selected voice-controlled device 102 may be activated and/or may be transitioned to a state where sensor data is being generated. Thereafter, the command to operate the connected device 104 may be sent to the connected device, which may cause the connected device 104, in this example, to turn on. In other examples, the command to operate the connected device 104 may be sent regardless of when the command associated with the sensor is sent. In this example, timing data associated with when commands are sent may be generated and utilized to determine when environmental changes occur based at least in part on operation of the connected device 104. By turning on, the light-emitting device that is plugged in to the connected device 104 may start emitting light into the environment in which the connected device 104 is situated.

At block 316, the smart-home speechlet 154 may receive the intent data and may determine one or more applications, which may in examples be described herein as skills, that are configured to handle the given intent. The applications may be utilized to communicate the request with a system associated with the connected device 104 and to receive a response from the system. For example, the smart-home speechlet 154 may determine that "Plug 1" is associated with a given application and may request that the application and/or the system associated with the connected device 104 take an action on the connected device 104 that corresponds to the request, here turning Plug 1 on. The system associated with the connected device 104 may return data to the smart-home speechlet 154 to respond to the user request, such data may include an identifier of the connected device 104, information for generating a command for operating the connected device 104, and/or TTS data for output of a response to the request, such as "okay" or "Plug 1 on."

In this example or in other examples, the smart-home speechlet 154 may generate directive data representing a directive to control the connected device 104. The directive data may be sent to the voice-controlled device 102 and/or to the connected device 104, which may cause the connected device 104 to be operated. By way of illustration, the operation may be to turn on Plug 1, which may allow electricity to flow from the outlet, through Plug 1, and to a secondary device that is plugged in to Plug 1. For ease of illustration and not by way of limitation, the secondary device may be, for example, a light emitting device such as a lamp. In this example, operating Plug 1 as described above may cause the secondary device to emit light.

At block 318, the ambient light sensor, which is sensing light levels in the environment, may detect the change in light level caused by the light-emitting device emitting light. For example, the ambient light sensor may be configured to sense lumens and may detect an increase in lumens when the connected device 104 is operated. Sensor data indicating this increase in lumens may be generated and may be sent, for example, to the smart-home speechlet 154.

At block 320, the smart-home speechlet 154 may receive the sensor data as well as state-change data indicating the state change of the connected device 104. In examples, the sensor data and the state-change data may be timestamped such that the smart-home speechlet 154 is configured to determine that a given environmental change as detected by a device sensor correlates to a given state change of a connected device 104. Additionally, the smart-home speechlet 154 may be configured to determine if the environmental change detected by the sensor at issue is sufficient to identify the device type of the secondary device. For example, when the sensor is a light sensor, the smart-home speechlet 154 may receive the sensor data indicating a degree of light change as detected by the sensor. The smart-home speechlet 154 may determine if the degree of light change satisfies a threshold degree of light change, and if so the smart-home speechlet 154 may determine that the connected device 104 is coupled to a light-emitting device having a "light" device type. Other nonlimiting examples of environmental changes include a degree of sound change as sensed by a microphone satisfying a threshold degree of sound change and/or a degree of temperature change as sensed by a temperature sensor satisfying a threshold degree of temperature change. In these examples, the smart-home speechlet 154 may determine that the connected device 104 is coupled to a speaker or a heater/cooler, respectively.

Additional data may be utilized by the smart-home speechlet 154 to determine the device type of the secondary device and/or to increase a confidence that the selected device type is accurate. For example, naming data associated with the connected device 104 may be utilized. In this example, a user and/or a system may have assigned a naming indicator to the connected device 104, such as "kitchen light." The inclusion of "light" in the naming indicator may increase a confidence that the device type is a "light" device type. Additionally, or alternatively, when multiple devices are selected to sense an environmental change, the sensor data from each of the multiple devices may be utilized. For example, multiple light sensors may be utilized to detect a change in light level. Also, a microphone may be utilized to detect the sound of a light turning on or off, and that audio data may be utilized to determine the device type.

Once the device type of the secondary device has been determined, the smart-home speechlet 154 may be utilized to generate and send a notification to a user device 106 associated with the connected device 104. For example, the notification may include information indicating that the system has determined the device type of the secondary device, an indication of that device type, and a request for user input to change the device type of the connected device 104 to the device type of the secondary device. Using the example above, the notification may indicate the system has determined that a light is coupled to the connected device 104 and may request user input switching the plug device type of the connected device 104 to a light device type. The notification may be sent to one or more user devices 106 that are indicated to be associated with the connected device 104, such as indicated by account data. The notification may include text to be presented on a display of the user device 106 and/or one or more selectable portions to allow for receipt of user input on the user device 106. The notification may additionally, or alternatively, include audio data and audio corresponding to the audio data may be output by speakers of one or more devices associated with the connected device 104, such as the voice-controlled devices 102. In these examples, after output of the notification, an audible response from the user may be provided and analyzed to determine if the device type should be converted as requested. When the input data indicates that the device type conversion should occur, the system may generate data indicating that the connected device 104 is associated with the determined device type in addition to or instead of the prior device type. This data may be stored in association with account data for the connected device 104.

In other examples, upon determining the device type for the secondary device that is coupled to the connected device 104, the system may automatically associate the connected device 104 with the determined device type in addition to or instead of the prior device type. A notification of this change may be sent to a user device 106 to confirm that the change should be maintained and/or to provide user input to not associate the connected device 104 with the determined device type. In examples, automatic association of the connected device 104 with the determined device type may be based at least in part on a confidence level associated with determining the device type, historical data indicating past user behaviors and/or requests associated with the connected device 104 and/or one or more other devices, user input indicating positive reinforcement of the operations described herein, such as a user utterance that includes "thank you," and/or combinations of some or all of these factors.

Figure 4:
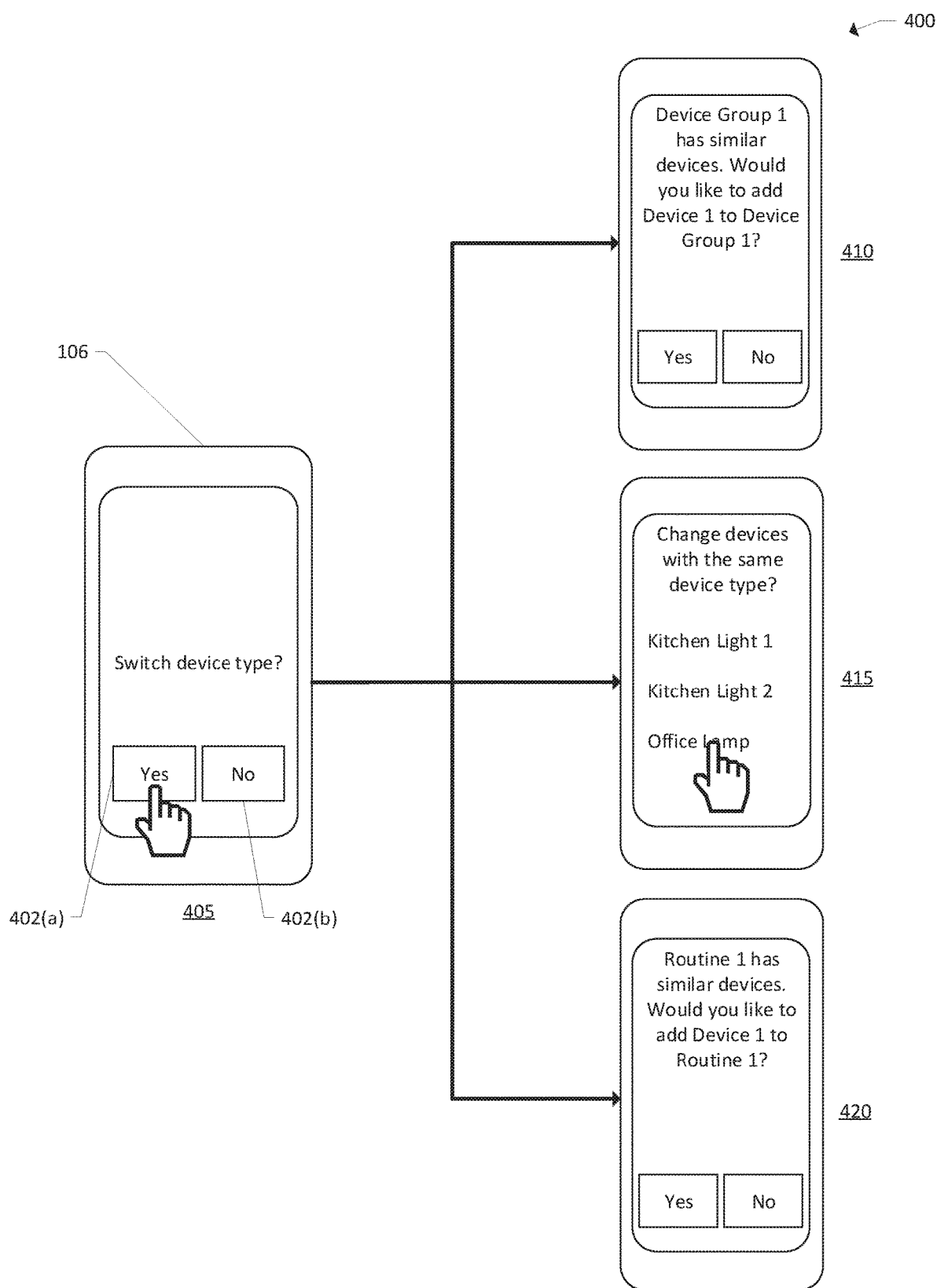
FIG. 4 illustrates an example user interface utilized for device functionality identification.

FIG. 4 illustrates an example user interface utilized for device functionality identification. The user interfaces 405-420 may be the same as or similar to the user interfaces described with respect to FIG. 1. FIG. 4 depicts changes to the user interface from user interface 405 to one or more of user interfaces 410, 415, and/or 420. The user interfaces may be utilized to assist in the conversion of device types, the grouping of devices, and/or the establishment and/or modification of routines associated with connected devices.

For example, the user interface 405 may be configured to display information associated with a notification that a device type of a connected device may be converted to another device type, such as described elsewhere herein. For example, when the device type of a secondary device coupled to the connected device is determined to be different from the device type of the connected device, a notification informing a user of as much may be sent to a user device 106, which may cause the user interface 405 to be displayed. The user interface 405 may also include one or more selectable portions 402(*a*), 402(*b*), which may provide the user with the option to provide input in response to the notification. For example, the user interface 405 may display selectable portions 402(*a*), 402(*b*) that, when selected by the user such as by touch input, may cause input data to be generated that indicates the user input. The input data may be utilized to associate the connected device with a particular device type in addition to or instead of a previous device type.

Additionally, or alternatively, the system for device functionality identification may determine one or more device groups to recommend adding the connected device to. For example, a user may have established a device group that includes multiple connected devices. For at least some device groups, the connected devices associated with a given device group may all have the same or similar device types, such as a light device type. Additionally, or alternatively, a given device group may have a naming indicator that indicates the device type of connected devices in the device group, such as Kitchen Lights. A grouping component, based at least in part on determining that the device type of a connected device is being changed an accordance with the processes described herein, may determine if the connected device should be added to a given device group having the same or similar device types. For example, if the grouping component determines that a plug device located in a given environment is to be associated with a light device type utilizing the processes described herein, and the grouping component receives data indicating that other connected devices in the environment with a light device type are associated with a device group, the grouping component may determine that the plug device is a candidate for inclusion in the device group. A notification may be generated and sent to the user device 106 requesting user input for the plug device to be added to the device group, and the plug device may be added based at least in part on the user input. The user interface 410 may be displayed and may be utilized to display information indicating that a given device group has similar devices to the device type that is being associated with the connected device, as described herein. The user interface 410 may include a request, such as "would you like to add Device 1 to Device Group 1?" In this way, the user interface 410 may be utilized to assist a user in grouping devices based at least in part on device functionality identification as described herein. In other examples, the user interface 410 may be utilized to recommend the creation of a new device group to include devices with the device type at issue. In these examples, the system may determine which devices are associated with the device type and may use other data, such as naming data associated with the devices and/or device-affinity data indicating which devices communicate with a given voice-enabled device most frequently.

Additionally, or alternatively, the system may determine one or more other connected devices that are associated with the device type of the connected device prior to conversion of the device type as described herein. For example, if a given connected device was associated with a plug device type and that device type is changed to a light device type based at least in part on the processes described herein, the smart-home speechlet may determine one or more other connected devices associated with the account data that are also associated with a plug device type. Having identified those connected devices, the smart-home speechlet may generate and send a notification to the user device 106 indicating the additional connected devices with the plug device type. The user interface 415 may be utilized to display information associated with the notification, such as one or more naming indicators of other connected devices with a device type that is the same or similar to the device type that has been associated with the connected device. The notification may also request user input indicating whether the user would like to convert those device types to the determined device type, here a light device type for example. The user may provide user input, which may be utilized to convert the device type for the other connected devices as indicated by the user input.

Additionally, or alternatively, a routine component of the system may determine one or more connected devices that are associated with a predefined routine and may recommend addition of the connected device at issue to the routine. For example, the user and/or the system may have established a routine to be performed in association with connected devices. An example of such a routine may be that multiple connected devices with a light device type turn on when motion is detected. When the device type of a connected device is converted as described herein to a similar device type as connected devices associated with a routine, the smart-home speechlet may generate a notification requesting user input indicating whether the connected device at issue should be included in the routine. The user interface 420 may be utilized to display information associated with the notification, such as an identification of the routine that has similar devices as the connected device is now associated with the determined device type. The user interface 420 may also request user input regarding whether the connected device should be added to the routine. The user may provide user input, which may be utilized to associate the connected device with the routine in question.

Figure 5:
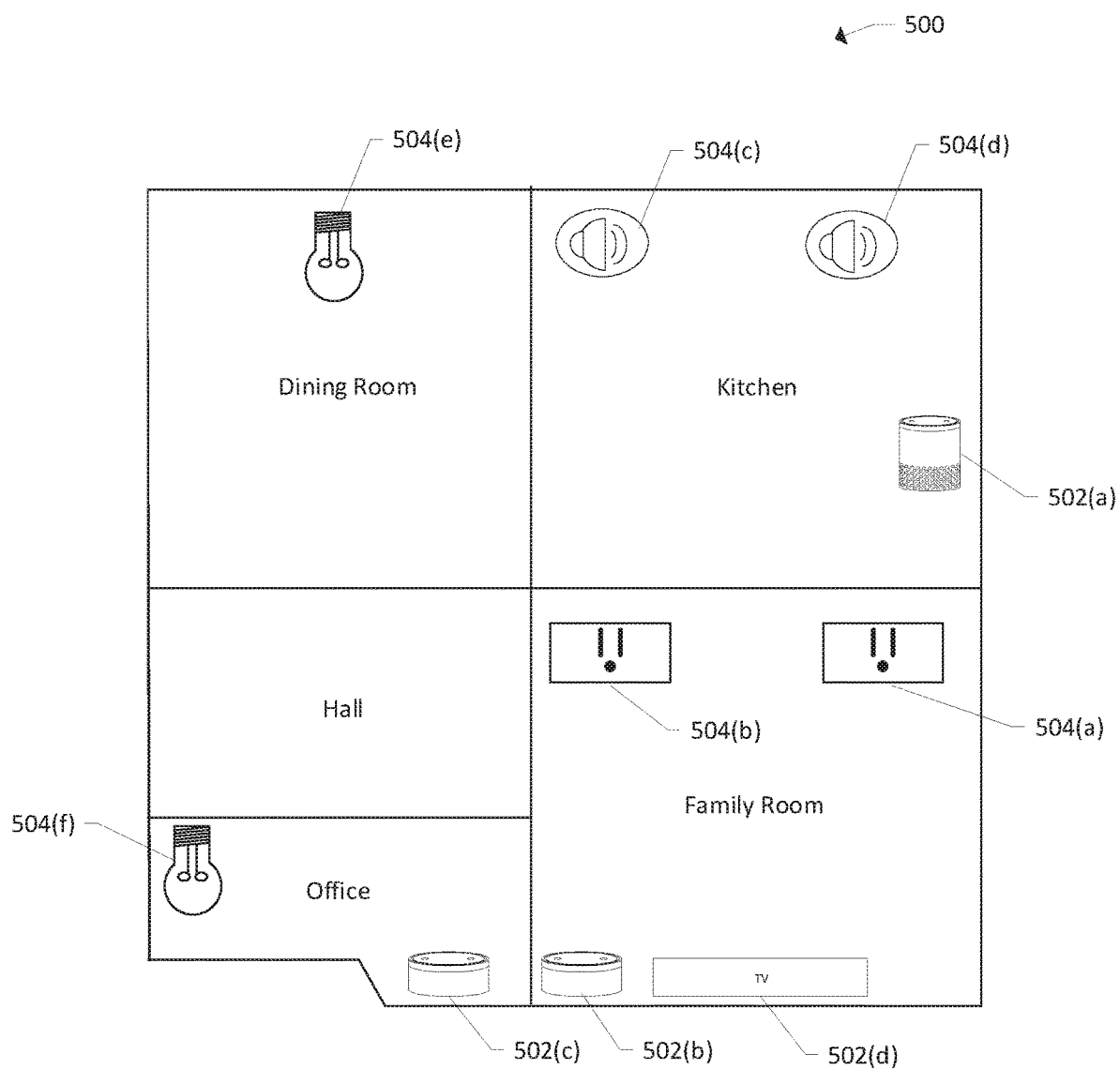
FIG. 5 illustrates an example schematic of an environment showing indicators of devices associated with the environment.

FIG. 5 illustrates an example schematic of an environment showing indicators of devices associated with the environment. In examples, a device such as a user device 106 may be utilized to provide a visual representation of the connected devices and/or voice-controlled devices associated with given account data and/or associated with a given environment. When device types are associated with the connected devices, a visual indicator of the device type may be provided. For example, connected devices that are associated with a speaker device type may be associated with speaker device identifiers 504(c), 504(d). Connected devices that are associated with a plug device type may be associated with plug device identifiers 504(a), 504(b). Connected devices that are associated with a light device type may be associated with light device identifiers 504(e), 504(f). Additionally, indicators of the voice-controlled devices and/or sensors associated with the voice-controlled devices may be provided. For example, voice-controlled device indicators 502(a)-(d) may be provided.

FIG. 5 also illustrates the spatial relationship between voice-controlled devices and connected devices. The smart-home speechlet of the smart-home system as described herein may utilize such spatial relationships to select one or more devices for sensing an environmental change. For example, account data may include data indicating which devices are associated with the connected device and the hardware configuration(s) of those devices. A given device may be considered a candidate device for selection when, for example, that device includes an environmental sensor as indicated from the account data. Examples of environmental sensors may include, for example, a light sensor such as an ambient light sensor, a microphone, a temperature sensor, an infrared sensor, one or more radar sensors, a motion sensor, a camera, and/or any other device that may sense a change in one or more conditions of an environment. In addition to identifying one or more candidate devices that include an environmental sensor, the smart-home speechlet may select one or more of the candidate devices to receive sensor data from. For example, given account data may indicate that a given environment includes multiple voice-controlled devices that have an ambient light sensor. The smart-home speechlet may also be configured to receive data associated with locations of the various voice-controlled devices and may utilize that data to determine which voice-controlled device(s) are closest to the connected device and/or that are otherwise positioned to detect an environmental change caused by operation of the connected device. The data associated with locations of devices may include, for example, spatial-perception data indicating distance between devices as determined from time-of-flight information, device-affinity data indicating which voice-controlled devices communicate most frequently with given connected devices, naming data indicating friendly names associated with voice-controlled device and/or connected devices, device-usage data indicating how voice-controlled devices and/or connected devices have been historically utilized, and/or user-setting data indicating configuration of the voice-controlled devices and/or connected devices by a user of the devices, for example. Utilizing the example provided above, the smart-home speechlet may identify a voice-controlled device that has an ambient light sensor and that is located in the same room as the connected device to be operated as the device from which to receive sensor data. It should be understood that while this example illustrates selection of one device from which to receive sensor data, more than one device may be selected. Additionally, while the example device includes an ambient light sensor, it should be understood that the selected device(s) may include an additional and/or different environmental sensor.

Figure 6:
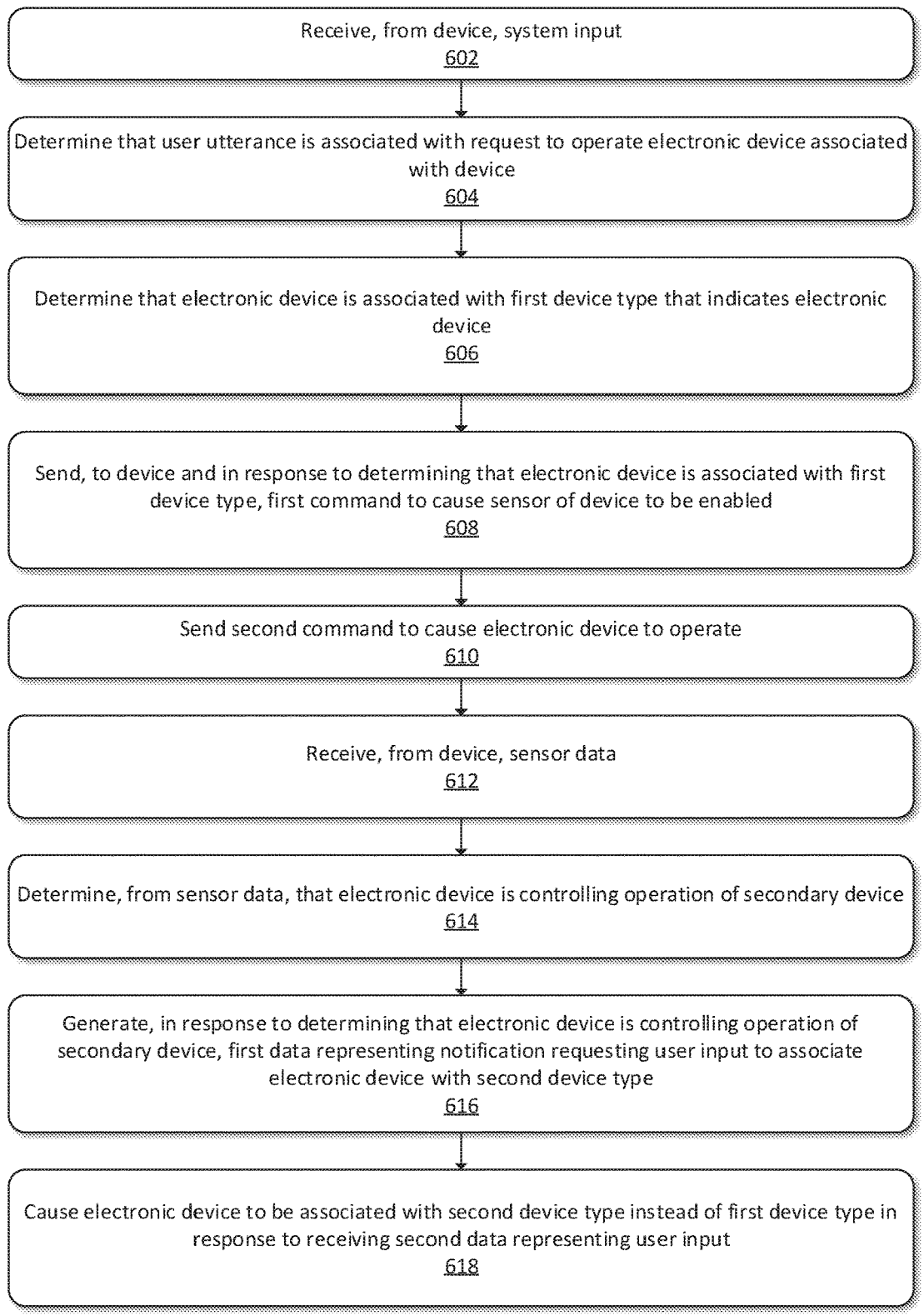
FIG. 6 illustrates a flow diagram of an example process for device functionality identification.
Figure 7:
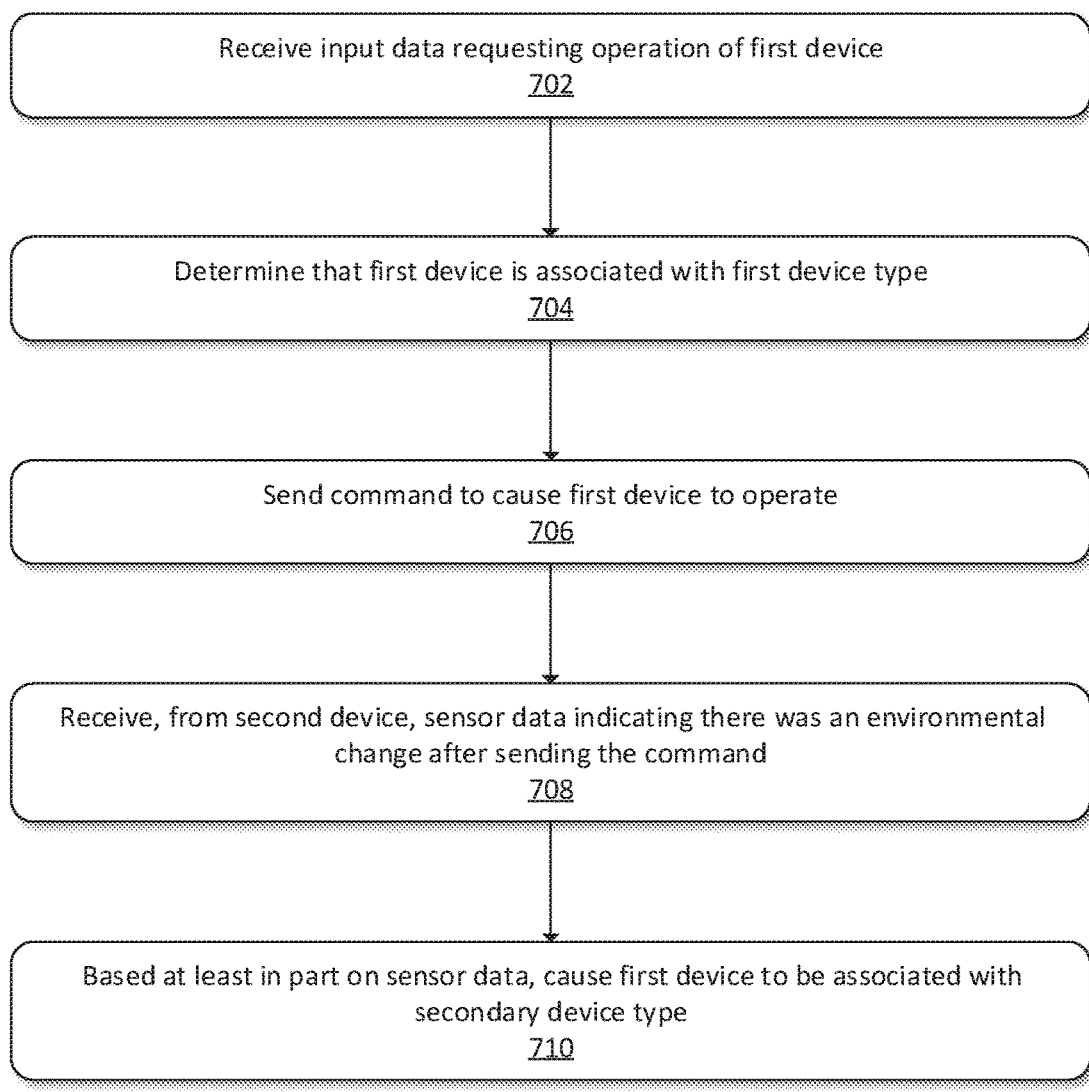
FIG. 7 illustrates a flow diagram of another example process for device functionality identification.

FIGS. 6 and 7 illustrates processes for device functionality identification. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-5 and 8-10, although the processes may be implemented in a wide variety of other environments, architectures and systems.

FIG. 6 illustrates a flow diagram of an example process 600 for device functionality identification. The order in which the operations or steps are described is not intended to be construed as a limitation, and any number of the described operations may be combined in any order and/or in parallel to implement process 600.

At block 602, the process 600 may include receiving, from a device, system input. For example, a user may request that the state of a connected device, otherwise described herein as an electronic device, be changed. This request may, for example, be an audible request such as "turn Plug 1 on." A voice-controlled device may capture audio representing the audible request and may generate corresponding audio data. The system input as described herein may include one or more of a user utterance, a touch interaction, a button press, such as a physical button build into a device, a motion sensor input, a contact sensor input, and/or input associated with any other device capable of triggering another device to perform an action. The system input and triggers associated with the system input may also include, for example, touch input to a user device such as a tablet, which may represent a user request to operate a device. The system input may also include presence detection (e.g., motion sensor, radar, sounds, etc.) which may cause one or more devices to activate. The system input may also include time-based triggers (e.g., timers, time-based routines, time of day, etc.) that, when they occur, may cause one or more devices to activate.

At block 604, the process 600 may include determining that the user utterance is associated with a request to operate an electronic device associated with the device. For example, the audio data may be sent to a speech-processing system to generate intent data representing the request to operate the connected device. For example, an ASR component may generate text data that corresponds to the audio data, and an NLU component may generate intent data based at least in part on the text data. In examples, the intent data may be generated based at least in part on the audio data without the generation of text data. The speech-processing system may determine that the request is associated with smart-home functionality and may send the intent data to the smart-home system, such as via the smart-home speechlet, to handle responding to the request. In other examples, a state change of the device may be requested without a voice request and instead may be from a user providing user input to the voice-controlled device, a user device, and/or the connected device.

At block 606, the process 600 may include determining that the electronic device is associated with a first device type. In examples, the first device type may indicate that the electronic device comprises a power receptacle configured to plug into an electrical outlet and to communicate with the device. For example, the smart-home speechlet, having received the intent data from the NLU component, may utilize the intent data and/or other data associated with the user request to determine account data associated with the voice-controlled device from which the audio data was received. The smart-home speechlet may utilize the account data, which may be received from the user registry, to determine which connected devices are associated with the voice-controlled device and the device types of those devices. With respect to a given request to operate a connected device, the smart-home speechlet may identify the device identifier of the connected device to be operated and may identify the device type associated with that device identifier. In the example provided herein, the smart-home speechlet may identify the device identifier for Plug 1 and may identify the device type as a plug device. Having identified the connected device as being associated with a predefined device type, here a plug device type by way of example, the smart-home speechlet may initiate a process for determining the device type of the secondary device. For example, the smart-home speechlet may select a device to be utilized to sense an environmental change in the environment in which the devices at issue are disposed.

The smart-home speechlet may receive a notification of device operation and/or a request to operate a given device. The smart-home speechlet may be configured to determine which devices in the environment are configured with one or more environmental sensors and/or may be configured to determine which device or devices are to be utilized to sense an environmental change utilizing the environmental sensor(s). For example, the account data may include data indicating which devices are associated with the connected device and the hardware configuration(s) of those devices. A given device may be considered a candidate device for selection when, for example, that device includes an environmental sensor as indicated from the account data. Examples of environmental sensors may include, for example, a light sensor such as an ambient light sensor, a microphone, a temperature sensor, an infrared sensor, one or more radar sensors, a motion sensor, a camera, and/or any other device that may sense a change in one or more conditions of an environment. In addition to identifying one or more candidate devices that include an environmental sensor, the smart-home speechlet may select one or more of the candidate devices to receive sensor data from. For example, given account data may indicate that a given environment includes multiple voice-controlled devices that have an ambient light sensor. The smart-home speechlet may also be configured to receive data associated with locations of the various voice-controlled devices and may utilize that data to determine which voice-controlled device(s) are closest to the connected device and/or that are otherwise positioned to detect an environmental change caused by operation of the connected device. The data associated with locations of devices may include, for example, spatial-perception data indicating distance between devices as determined from time-of-flight information, device-affinity data indicating which voice-controlled devices communicate most frequently with given connected devices, naming data indicating friendly names associated with voice-controlled device and/or connected devices, device-usage data indicating how voice-controlled devices and/or connected devices have been historically utilized, and/or user-setting data indicating configuration of the voice-controlled devices and/or connected devices by a user of the devices, for example. Utilizing the example provided above, the smart-home speechlet may identify a voice-controlled device that has an ambient light sensor and that is located in the same room as the connected device to be operated as the device from which to receive sensor data. It should be understood that while this example illustrates selection of one device from which to receive sensor data, more than one device may be selected. Additionally, while the example device includes an ambient light sensor, it should be understood that the selected device(s) may include an additional and/or different environmental sensor.

At block 608, the process 600 may include sending, to the device and in response to determining that the electronic device is associated with the first device type, a first command to cause a sensor of the device to be enabled. In examples, the sensor may be an ambient-light sensor. For example, the smart-home speechlet may generate and send a command to the selected device to, in examples, activate the sensor and/or to instruct the device to send sensor data as generated by the sensor. Selection of a device and sending of the command to the selected device to provide sensor data may be performed prior to operation of the connected device, as described above. In this way, a device may be selected and the sensor of the device may be activated prior to the connected device being operated. As such, when the connected device is operated, a change to one or more conditions of the environment caused by operation of the connected device may be detected by the sensor of the selected device. It should be understood that while the selected device is depicted and described herein by way of example as the voice-controlled device, the selected device may be any device that includes a sensor and/or may be just a sensor itself. Utilizing the example provided above, the ambient light sensor of the selected voice-controlled device may be activated and/or may be transitioned to a state where sensor data is being generated. Thereafter, the command to operate the connected device may be sent to the connected device, which may cause the connected device, in this example, to turn on. In other examples, the command to operate the connected device may be sent regardless of when the command associated with the sensor is sent. In this example, timing data associated with when commands are sent may be generated and utilized to determine when environmental changes occur based at least in part on operation of the connected device. By turning on, the light-emitting device that is plugged in to the connected device may start emitting light into the environment in which the connected device is situated.

The ambient light sensor, which is sensing light levels in the environment, may detect the change in light level caused by the light-emitting device emitting light. For example, the ambient light sensor may be configured to sense lumens and may detect an increase in lumens when the connected device is operated. Sensor data indicating this increase in lumens may be generated and may be sent, for example, to a smart-home speechlet.

At block 610, the process 600 may include sending a second command to cause the electronic device to operate. For example, the smart-home speechlet may receive the intent data and may determine one or more applications, which may in examples be described herein as skills, that are configured to handle the given intent. The applications may be utilized to communicate the request with a system associated with the connected device and to receive a response from the system. For example, the smart-home speechlet may determine that "Plug 1" is associated with a given application and may request that the application and/or the system associated with the connected device take an action on the connected device that corresponds to the request, here turning Plug 1 on. The system associated with the connected device may return data to the smart-home speechlet to respond to the user request, such data may include an identifier of the connected device, information for generating a command for operating the connected device, and/or TTS data for output of a response to the request, such as "okay" or "Plug 1 on." In this example or in other examples, the smart-home speechlet may generate directive data representing a directive to control the connected device. The directive data may be sent to the voice-controlled device and/or to the connected device, which may cause the connected device to be operated. By way of illustration, the operation may be to turn on Plug 1, which may allow electricity to flow from the outlet, through Plug 1, and to a secondary device that is plugged in to Plug 1. For ease of illustration and not by way of limitation, the secondary device may be, for example, a light emitting device such as a lamp. In this example, operating Plug 1 as described above may cause the secondary device to emit light.

At block 612, the process 600 may include receiving, from the device, sensor data. In examples, the sensor data may indicate that the ambient-light sensor sensed an increase in lumens following sending the second command. For example, the smart-home speechlet may receive the sensor data as well as state-change data indicating the state change of the connected device.

At block 614, the process 600 may include determining, from the sensor data, that the electronic device is controlling operation of a secondary device. In examples, the secondary device may be a light bulb. In examples, the sensor data and the state-change data may be timestamped such that the smart-home speechlet is configured to determine that a given environmental change as detected by a device sensor correlates to a given state change of a connected device. Additionally, the smart-home speechlet may be configured to determine if the environmental change detected by the sensor at issue is sufficient to identify the device type of the secondary device. For example, when the sensor is a light sensor, the smart-home speechlet may receive the sensor data indicating a degree of light change as detected by the sensor. The smart-home speechlet may determine if the degree of light change satisfies a threshold degree of light change, and if so the smart-home speechlet may determine that the connected device is coupled to a light-emitting device having a "light" device type. Other nonlimiting examples of environmental changes include a degree of sound change as sensed by a microphone satisfying a threshold degree of sound change and/or a degree of temperature change as sensed by a temperature sensor satisfying a threshold degree of temperature change. In these examples, the smart-home speechlet may determine that the connected device is coupled to a speaker or a heater/cooler, respectively.

Additional data may be utilized by the smart-home speechlet to determine the device type of the secondary device and/or to increase a confidence that the selected device type is accurate. For example, naming data associated with the connected device may be utilized. In this example, a user and/or a system may have assigned a naming indicator to the connected device, such as "kitchen light." The inclusion of "light" in the naming indicator may increase a confidence that the device type is a "light" device type. Additionally, or alternatively, when multiple devices are selected to sense an environmental change, the sensor data from each of the multiple devices may be utilized. For example, multiple light sensors may be utilized to detect a change in light level. Also, a microphone may be utilized to detect the sound of a light turning on or off, and that audio data may be utilized to determine the device type.

At block 616, the process 600 may include generating, in response to determining that the electronic device is controlling operation of the secondary device, first data representing a notification requesting user input to associate the electronic device with a second device type. For example, a smart-home speechlet may be utilized to generate and send a notification to a user device associated with the connected device. For example, the notification may include information indicating that the system has determined the device type of the secondary device, an indication of that device type, and a request for user input to change the device type of the connected device to the device type of the secondary device. Using the example above, the notification may indicate the system has determined that a light is coupled to the connected device and may request user input switching the plug device type of the connected device to a light device type. The notification may be sent to one or more user devices that are indicated to be associated with the connected device, such as indicated by account data. The notification may include text to be presented on a display of the user device and/or one or more selectable portions to allow for receipt of user input on the user device. The notification may additionally, or alternatively, include audio data and audio corresponding to the audio data may be output by speakers of one or more devices associated with the connected device, such as the voice-controlled devices. In these examples, after output of the notification, an audible response from the user may be provided and analyzed to determine if the device type should be converted as requested.

At block 618, the process 600 may include causing the electronic device to be associated with the second device type in addition to or instead of the first device type in response to receiving second data representing the user input. For example, when the input data indicates that the device type conversion should occur, the system may generate data indicating that the connected device is associated with the determined device type in addition to or instead of the prior device type. This data may be stored in association with account data for the connected device.

Additionally, or alternatively, the process 600 may include determining account data associated with the voice-controlled device and the first electronic device. The process 600 may also include determining that the account data indicates a second electronic device having the first device type. In these examples, the first data representing the notification may request the user input to associate the first electronic device and the second electronic device with the second device type.

Additionally, or alternatively, the process 600 may include determining account data associated with the voice-controlled device and the electronic device. The process 600 may also include determining that the account data indicates a grouping of electronic devices associated with the second device type. The process 600 may also include generating, in response to causing the electronic device to be associated with the second device type, third data representing a second notification requesting second user input to associate the electronic device with the grouping of electronic devices. The process 600 may also include causing the electronic device to be associated with the grouping of electronic devices in response to receiving fourth data representing the second user input.

Additionally, or alternatively, the process 600 may include identifying, utilizing account data associated with the voice-controlled device and in response to determining that the electronic device is associated with the first device type, one or more devices associated with the electronic device that include at least one ambient-light sensor, the one or more devices including the voice-controlled device. The process 600 may include selecting, from third data indicating the voice-controlled device has been utilized to control operation of the electronic device, the voice-controlled device to send the first command to. In these examples, sending the first command to the voice-controlled device may be in response to selecting the voice-controlled device.

FIG. 7 illustrates a flow diagram of another example process 700 for device functionality identification. The order in which the operations or steps are described is not intended to be construed as a limitation, and any number of the described operations may be combined in any order and/or in parallel to implement process 700.

At block 702, the process 700 may include receiving input data requesting operation of a first device. For example, a user may request that the state of a connected device, otherwise described herein as an electronic device, be changed. This request may, for example, be an audible request such as "turn Plug 1 on." A voice-controlled device may capture audio representing the audible request and may generate corresponding audio data. The input data may additionally, or alternatively, include input data provided by a user device and/or a system associated with the first device.

At block 704, the process 700 may include determining that the first device is associated with a first device type. For example, the smart-home speechlet, having received the intent data from the NLU component, may utilize the intent data and/or other data associated with the user request to determine account data associated with the voice-controlled device from which the audio data was received. The smart-home speechlet may utilize the account data, which may be received from the user registry, to determine which connected devices are associated with the voice-controlled device and the device types of those devices. With respect to a given request to operate a connected device, the smart-home speechlet may identify the device identifier of the connected device to be operated and may identify the device type associated with that device identifier. In the example provided herein, the smart-home speechlet may identify the device identifier for Plug 1 and may identify the device type as a plug device. Having identified the connected device as being associated with a predefined device type, here a plug device type by way of example, the smart-home speechlet may initiate a process for determining the device type of the secondary device. For example, the smart-home speechlet may select a device to be utilized to sense an environmental change in the environment in which the devices at issue are disposed.

The smart-home speechlet may receive a notification of device operation and/or a request to operate a given device. The smart-home speechlet may be configured to determine which devices in the environment are configured with one or more environmental sensors and/or may be configured to determine which device or devices are to be utilized to sense an environmental change utilizing the environmental sensor(s). For example, the account data may include data indicating which devices are associated with the connected device and the hardware configuration(s) of those devices. A given device may be considered a candidate device for selection when, for example, that device includes an environmental sensor as indicated from the account data. Examples of environmental sensors may include, for example, a light sensor such as an ambient light sensor, a microphone, a temperature sensor, an infrared sensor, one or more radar sensors, a motion sensor, a camera, and/or any other device that may sense a change in one or more conditions of an environment. In addition to identifying one or more candidate devices that include an environmental sensor, the smart-home speechlet may select one or more of the candidate devices to receive sensor data from. For example, given account data may indicate that a given environment includes multiple voice-controlled devices that have an ambient light sensor. The smart-home speechlet may also be configured to receive data associated with locations of the various voice-controlled devices and may utilize that data to determine which voice-controlled device(s) are closest to the connected device and/or that are otherwise positioned to detect an environmental change caused by operation of the connected device. The data associated with locations of devices may include, for example, spatial-perception data indicating distance between devices as determined from time-of-flight information, device-affinity data indicating which voice-controlled devices communicate most frequently with given connected devices, naming data indicating friendly names associated with voice-controlled device and/or connected devices, device-usage data indicating how voice-controlled devices and/or connected devices have been historically utilized, and/or user-setting data indicating configuration of the voice-controlled devices and/or connected devices by a user of the devices, for example. Utilizing the example provided above, the smart-home speechlet may identify a voice-controlled device that has an ambient light sensor and that is located in the same room as the connected device to be operated as the device from which to receive sensor data. It should be understood that while this example illustrates selection of one device from which to receive sensor data, more than one device may be selected. Additionally, while the example device includes an ambient light sensor, it should be understood that the selected device(s) may include an additional and/or different environmental sensor.

The process 700 may include sending, to a second device and based at least in part on receiving the input data and/or determining that the first device is associated with the first device type, a command to cause a sensor of the second device to be enabled. For example, the smart-home speechlet may generate and send a command to the selected device to, in examples, activate the sensor and/or to instruct the device to send sensor data as generated by the sensor. Selection of a device and sending of the command to the selected device to provide sensor data may be performed prior to operation of the connected device, as described above. In this way, a device may be selected and the sensor of the device may be activated prior to the connected device being operated. As such, when the connected device is operated, a change to one or more conditions of the environment caused by operation of the connected device may be detected by the sensor of the selected device. It should be understood that while the selected device is depicted and described herein by way of example as the voice-controlled device, the selected device may be any device that includes a sensor and/or may be just a sensor itself. Utilizing the example provided above, the ambient light sensor of the selected voice-controlled device may be activated and/or may be transitioned to a state where sensor data is being generated. Thereafter, the command to operate the connected device may be sent to the connected device, which may cause the connected device, in this example, to turn on. In other examples, the command to operate the connected device may be sent regardless of when the command associated with the sensor is sent. In this example, timing data associated with when commands are sent may be generated and utilized to determine when environmental changes occur based at least in part on operation of the connected device. By turning on, the light-emitting device that is plugged in to the connected device may start emitting light into the environment in which the connected device is situated.

The ambient light sensor, which is sensing light levels in the environment, may detect the change in light level caused by the light-emitting device emitting light. For example, the ambient light sensor may be configured to sense lumens and may detect an increase in lumens when the connected device is operated. Sensor data indicating this increase in lumens may be generated and may be sent, for example, to a smart-home speechlet.

At block 706, the process 700 may include sending a command to cause the first device to operate. For example, the smart-home speechlet may receive the intent data and may determine one or more applications, which may in examples be described herein as skills, that are configured to handle the given intent. The applications may be utilized to communicate the request with a system associated with the connected device and to receive a response from the system. For example, the smart-home speechlet may determine that "Plug 1" is associated with a given application and may request that the application and/or the system associated with the connected device take an action on the connected device that corresponds to the request, here turning Plug 1 on. The system associated with the connected device may return data to the smart-home speechlet to respond to the user request, such data may include an identifier of the connected device, information for generating a command for operating the connected device, and/or TTS data for output of a response to the request, such as "okay" or "Plug 1 on." In this example or in other examples, the smart-home speechlet may generate directive data representing a directive to control the connected device. The directive data may be sent to the voice-controlled device and/or to the connected device, which may cause the connected device to be operated. By way of illustration, the operation may be to turn on Plug 1, which may allow electricity to flow from the outlet, through Plug 1, and to a secondary device that is plugged in to Plug 1. For ease of illustration and not by way of limitation, the secondary device may be, for example, a light emitting device such as a lamp. In this example, operating Plug 1 as described above may cause the secondary device to emit light.

At block 708, the process 700 may include receiving, from the second device, sensor data indicating there was an environmental change after sending the command. For example, the smart-home speechlet may receive the sensor data as well as state-change data indicating the state change of the connected device. In examples, the sensor data and the state-change data may be timestamped such that the smart-home speechlet is configured to determine that a given environmental change as detected by a device sensor correlates to a given state change of a connected device. Additionally, the smart-home speechlet may be configured to determine if the environmental change detected by the sensor at issue is sufficient to identify the device type of the secondary device. For example, when the sensor is a light sensor, the smart-home speechlet may receive the sensor data indicating a degree of light change as detected by the sensor. The smart-home speechlet may determine if the degree of light change satisfies a threshold degree of light change, and if so the smart-home speechlet may determine that the connected device is coupled to a light-emitting device having a "light" device type. Other nonlimiting examples of environmental changes include a degree of sound change as sensed by a microphone satisfying a threshold degree of sound change and/or a degree of temperature change as sensed by a temperature sensor satisfying a threshold degree of temperature change. In these examples, the smart-home speechlet may determine that the connected device is coupled to a speaker or a heater/cooler, respectively.

Additional data may be utilized by the smart-home speechlet to determine the device type of the secondary device and/or to increase a confidence that the selected device type is accurate. For example, naming data associated with the connected device may be utilized. In this example, a user and/or a system may have assigned a naming indicator to the connected device, such as "kitchen light." The inclusion of "light" in the naming indicator may increase a confidence that the device type is a "light" device type. Additionally, or alternatively, when multiple devices are selected to sense an environmental change, the sensor data from each of the multiple devices may be utilized. For example, multiple light sensors may be utilized to detect a change in light level. Also, a microphone may be utilized to detect the sound of a light turning on or off, and that audio data may be utilized to determine the device type.

At block 710, the process 700 may include, based at least in part on the sensor data indicating that the sensor detected the environmental change, at least one of generating first data representing a notification requesting user input to associate the first device with a second device type or causing the first device to be associated with the second device type, such as without a notification. In examples where a notification is generated, a smart-home speechlet may be utilized to generate and send a notification to a user device associated with the connected device. For example, the notification may include information indicating that the system has determined the device type of the secondary device, an indication of that device type, and a request for user input to change the device type of the connected device to the device type of the secondary device. Using the example above, the notification may indicate the system has determined that a light is coupled to the connected device and may request user input switching the plug device type of the connected device to a light device type. The notification may be sent to one or more user devices that are indicated to be associated with the connected device, such as indicated by account data. The notification may include text to be presented on a display of the user device and/or one or more selectable portions to allow for receipt of user input on the user device. The notification may additionally, or alternatively, include audio data and audio corresponding to the audio data may be output by speakers of one or more devices associated with the connected device, such as the voice-controlled devices. In these examples, after output of the notification, an audible response from the user may be provided and analyzed to determine if the device type should be converted as requested.

In examples where a notification is generated, the process 700 may include causing the first device to be associated with the second device type in addition to or instead of the first device type based at least in part on second data representing the user input. For example, when the input data indicates that the device type conversion should occur, the system may generate data indicating that the connected device is associated with the determined device type in addition to or instead of the prior device type. This data may be stored in association with account data for the connected device.

In other examples, a notification may not be generated and instead the system may associate the first device with the second device type based at least in part on the sensor data indicating that the sensor detected the environmental change. In still other examples, the system may first associate the first device with the second device type and then send a notification to the user device indicating that the change has been made. The notification, in these examples, may provide functionality that allows the user to provide input confirming that the change is authorized and/or indicating that the first device should not be associated with the second device type.

Additionally, or alternatively, the process 700 may include determining account data associated with the first device and the second device. The process 700 may also include determining that the account data indicates a third device having the first device type. In these examples, the first data representing the notification may request the user input to associate the first device and the third device with the second device type.

Additionally, or alternatively, the process 700 may include determining account data associated with the first device and the second device. The process 700 may also include determining that the account data indicates a grouping of devices associated with the secondary device type. The process 700 may also include generating, based at least in part on causing the first device to be associated with the secondary device type, data representing a notification requesting user input to associate the first device with the grouping of devices. The process 700 may also include causing the first device to be associated with the grouping of devices based at least in part on receiving data representing the user input.

Additionally, or alternatively, the process 700 may include identifying, utilizing account data associated with the second device and in response to determining that the first device is associated with the first device type, one or more devices associated with the first device that include at least one environmental sensor, the one or more devices including the second device. The process 700 may also include selecting the second device to send the first command to based at least in part on data indicating the second device has been utilized to control operation of the first device. In these examples, sending the command to the second device may be based at least in part on selecting the second device.

Additionally, or alternatively, the process 700 may include receiving state-change data indicating that an operational state of the first device has changed and determining that the sensor data was received within a threshold amount of time of receipt of the state-change data. In these examples, generating the first data may be based at least in part on determining that the sensor data was received within the threshold amount of time of receipt of the state-change data.

Additionally, or alternatively, the process 700 may include the sensor data indicating a change in lumens and the environmental change representing the change in lumens satisfying a threshold change in lumens as detected by the light sensor. In these examples, the second device type that is associated with the first device may represent a light. In other examples, the process 700 may include the sensor data indicating a change in audio captured by a microphone of the second device and the environmental change representing the change in audio satisfying a threshold change in audio. In these examples, the secondary device type that is associated with the first device may represent an audio-output device. In other examples, the process 700 may include the sensor data indicating a change in temperature and the environmental change representing the change in temperature satisfying a threshold change in temperature. In these examples, the secondary device type may represent a heating device.

Additionally, or alternatively, the process 700 may include determining account data associated with the first device and the second device. The process 700 may also include determining that the account data indicates that an automated operation has been set to be performed by a group of devices associated with the secondary device type. The process 700 may also include generating, based at least in part on causing the first device to be associated with the secondary device type, third data representing a notification requesting user input to associate the first device with the automated operation. The process 700 may also include causing the first device to be associated with the automated operation based at least in part on receiving data representing the user input.

Figure 8:
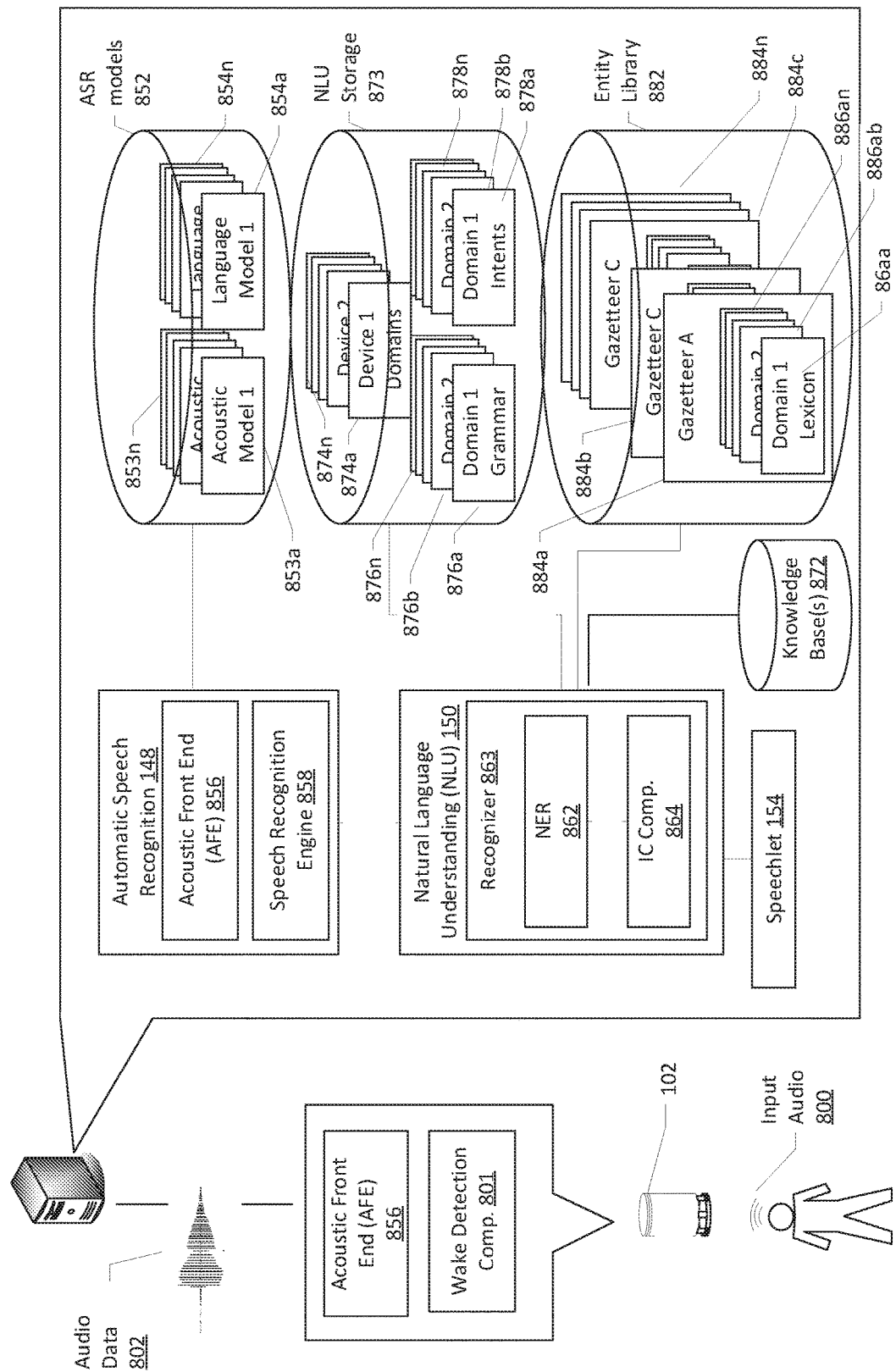
FIG. 8 illustrates a conceptual diagram of components of a speech-processing system for processing audio data provided by one or more devices.

FIG. 8 illustrates a conceptual diagram of components of a speech-processing system for processing audio data provided by one or more devices. FIG. 8 illustrates a conceptual diagram of how a spoken utterance can be processed, allowing a system to capture and execute commands spoken by a user, such as spoken commands that may follow a wakeword, or trigger expression, (i.e., a predefined word or phrase for "waking" a device, causing the device to begin sending audio data to a remote system, such as system 108). The various components illustrated may be located on a same device or different physical devices. Message between various components illustrated in FIG. 8 may occur directly or across a network 110. An audio capture component, such as a microphone of the device 102, or another device, captures audio 800 corresponding to a spoken utterance. The device 102, using a wake-word component 801, then processes audio data corresponding to the audio 800 to determine if a keyword (such as a wakeword) is detected in the audio data. Following detection of a wakeword, the device 102 sends audio data 802 corresponding to the utterance to the remote system 108 that includes an ASR component 148. The audio data 802 may be output from an optional acoustic front end (AFE) 856 located on the device prior to transmission. In other instances, the audio data 802 may be in a different form for processing by a remote AFE 856, such as the AFE 856 located with the ASR component 148 of the remote system 108.

The wake-word component 801 works in conjunction with other components of the user device, for example a microphone to detect keywords in audio 800. For example, the device may convert audio 800 into audio data, and process the audio data with the wake-word component 801 to determine whether human sound is detected, and if so, if the audio data comprising human sound matches an audio signature and/or model corresponding to a particular keyword.

The user device may use various techniques to determine whether audio data includes human sound. Some embodiments may apply voice activity detection (VAD) techniques. Such techniques may determine whether human sound is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the user device may implement a limited classifier configured to distinguish human sound from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in human sound storage, which acoustic models may include models corresponding to human sound, noise (such as environmental noise or background noise), or silence. Still other techniques may be used to determine whether human sound is present in the audio input.

Once human sound is detected in the audio received by user device (or separately from human sound detection), the user device may use the wake-word component 801 to perform wakeword detection to determine when a user intends to speak a command to the user device. This process may also be referred to as keyword detection, with the wakeword being a specific example of a keyword. Specifically, keyword detection may be performed without performing linguistic analysis, textual analysis or semantic analysis. Instead, incoming audio (or audio data) is analyzed to determine if specific characteristics of the audio match preconfigured acoustic waveforms, audio signatures, or other data to determine if the incoming audio "matches" stored audio data corresponding to a keyword.

Thus, the wake-word component 801 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise, etc. There can be one or more HMMs built to model the non-wake-word speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment, the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the local device 102 may "wake" and begin transmitting audio data 802 corresponding to input audio 800 to the remote system 108 for speech processing. Audio data corresponding to that audio may be sent to remote system 108 for routing to a recipient device or may be sent to the remote system 108 for speech processing for interpretation of the included speech (either for purposes of enabling voice-messages and/or for purposes of executing a command in the speech). The audio data 802 may include data corresponding to the wakeword, or the portion of the audio data corresponding to the wake-word may be removed by the local device 102 prior to sending. Further, a local device may "wake" upon detection of speech/spoken audio above a threshold, as described herein. Upon receipt by the remote system 108, an ASR component 148 may convert the audio data 802 into text. The ASR transcribes audio data into text data representing the words of the speech contained in the audio data 802. The text data may then be used by other components for various purposes, such as executing system commands, inputting data, etc. A spoken utterance in the audio data is input to a processor configured to perform ASR which then interprets the utterance based on the similarity between the utterance and pre-established language models 854 stored in an ASR model knowledge base (ASR Models Storage 852). For example, the ASR process may compare the input audio data with models for sounds (e.g., subword units or phonemes) and sequences of sounds to identify words that match the sequence of sounds spoken in the utterance of the audio data. In examples where a new device type is associated with given account data and/or device identifiers, that device type may be added to a list of device types utilized by the language models 854.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 853 stored in an ASR Models Storage 852), and the likelihood that a particular word that matches the sounds would be included in the sentence at the specific location (e.g., using a language or grammar model). Thus, each potential textual interpretation of the spoken utterance (hypothesis) is associated with a confidence score. Based on the considered factors and the assigned confidence score, the ASR process 148 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 856 and a speech recognition engine 858. The acoustic front end (AFE) 856 transforms the audio data from the microphone into data for processing by the speech recognition engine 858. The speech recognition engine 858 compares the speech recognition data with acoustic models 853, language models 854, and other data models and information for recognizing the speech conveyed in the audio data. The AFE 856 may reduce noise in the audio data and divide the digitized audio data into frames representing time intervals for which the AFE 856 determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 858 may process the output from the AFE 856 with reference to information stored in speech/model storage (852). Alternatively, post front-end processed data (such as feature vectors) may be received by the device executing ASR processing from another source besides the internal AFE. For example, the user device may process audio data into feature vectors (for example using an on-device AFE 856) and transmit that information to a server across a network for ASR processing. Feature vectors may arrive at the remote system 108 encoded, in which case they may be decoded prior to processing by the processor executing the speech recognition engine 858.

The speech recognition engine 858 attempts to match received feature vectors to language phonemes and words as known in the stored acoustic models 853 and language models 854. The speech recognition engine 858 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc. By way of example, a user utterance may be "Alexa, turn on Kitchen Light?" The wake detection component may identify the wake word, otherwise described as a trigger expression, "Alexa," in the user utterance and may "wake" based on identifying the wake word. Audio data corresponding to the user utterance may be sent to the remote system 108, where the speech recognition engine 858 may identify, determine, and/or generate text data corresponding to the user utterance, here "turn on Kitchen Light."

The speech recognition engine 858 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 858 to other processing components, which may be local to the device performing ASR and/or distributed across the network(s). For example, ASR results in the form of a single textual representation of the speech, an N-best list including multiple hypotheses and respective scores, lattice, etc. may be sent to the remote system 108, for natural language understanding (NLU) processing, such as conversion of the text into commands for execution, either by the user device, by the remote system 108, or by another device (such as a server running a specific application like a search engine, etc.).

The device performing NLU processing 150 (e.g., server 108) may include various components, including potentially dedicated processor(s), memory, storage, etc. As shown in FIG. 8, an NLU component 150 may include a recognizer 863 that includes a named entity recognition (NER) component 862 which is used to identify portions of query text that correspond to a named entity that may be recognizable by the system. A downstream process called named entity resolution links a text portion to a specific entity known to the system. To perform named entity resolution, the system may utilize gazetteer information (884a-884n) stored in entity library storage 882. The gazetteer information may be used for entity resolution, for example matching ASR results with different entities (such as electronic devices, electronic devices, etc.) Gazetteers may be linked to users (for example a particular gazetteer may be associated with a specific user's device associations), may be linked to certain domains (such as music, shopping, etc.), or may be organized in a variety of other ways.

Generally, the NLU process takes textual input (such as processed from ASR 148 based on the utterance input audio 800) and attempts to make a semantic interpretation of the text. That is, the NLU process determines the meaning behind the text based on the individual words and then implements that meaning. NLU processing 150 interprets a text string to derive an intent or a desired action from the user as well as the pertinent pieces of information in the text that allow a device (e.g., device 102) to complete that action. For example, if a spoken utterance is processed using ASR 148 and outputs the text "what is the title of this song" the NLU process may determine that the user intended to receive information indicating the title of a song being output by a device 102. In examples where a new device type is associated with a given user account and/or device identifier, one or more intents and/or portions of intents and/or slots may be generated and stored for use by the NLU 150.

The NLU may process several textual inputs related to the same utterance. For example, if the ASR 148 outputs N text segments (as part of an N-best list), the NLU may process all N outputs to obtain NLU results.

As will be discussed further below, the NLU process may be configured to parse and tag to annotate text as part of NLU processing. For example, for the text "turn on Kitchen Light," "turn on" may be tagged as a command (to enable operation of a connected device) and "Kitchen Light" may be tagged as the naming identifier of the connected device.

To correctly perform NLU processing of speech input, an NLU process 150 may be configured to determine a "domain" of the utterance so as to determine and narrow down which services offered by the endpoint device (e.g., remote system 108 or the user device) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The named entity recognition (NER) component 862 receives a query in the form of ASR results and attempts to identify relevant grammars and lexical information that may be used to construe meaning. To do so, the NLU component 150 may begin by identifying potential domains that may relate to the received query. The NLU storage 873 includes a database of devices (874a-874n) identifying domains associated with specific devices. For example, the user device may be associated with domains for music, telephony, calendaring, contact lists, and device-specific messages, but not video. In addition, the entity library may include database entries about specific services on a specific device, either indexed by Device ID, User ID, or Household ID, or some other indicator.

In NLU processing, a domain may represent a discrete set of activities having a common theme, such as "banking," "health care," "smart home," "communications," "shopping," "music," "calendaring," etc. As such, each domain may be associated with a particular recognizer 863, language model and/or grammar database (876a-876n), a particular set of intents/actions (878a-878n), and a particular personalized lexicon (886). Each gazetteer (884a-884n) may include domain-indexed lexical information associated with a particular user and/or device. For example, the Gazetteer A (884a) includes domain-index lexical information 886aa to 886an. A user's contact-list lexical information might include the names of contacts. Since every user's contact list is presumably different, this personalized information improves entity resolution.

As noted above, in traditional NLU processing, a query may be processed applying the rules, models, and information applicable to each identified domain. For example, if a query potentially implicates both messages and, for example, music, the query may, substantially in parallel, be NLU processed using the grammar models and lexical information for messages, and will be processed using the grammar models and lexical information for music. The responses based on the query produced by each set of models is scored, with the overall highest ranked result from all applied domains ordinarily selected to be the correct result.

An intent classification (IC) component 864 parses the query to determine an intent or intents for each identified domain, where the intent corresponds to the action to be performed that is responsive to the query. Each domain is associated with a database (878a-878n) of words linked to intents. For example, a communications intent database may link words and phrases such as "turn on," "enable," "activate," to a "turn on" intent. By way of further example, a timer intent database may link words and phrases such as "set," "start," "initiate," and "enable" to a "set timer" intent. A voice-message intent database, meanwhile, may link words and phrases such as "send a message," "send a voice message," "send the following," or the like. The IC component 864 identifies potential intents for each identified domain by comparing words in the query to the words and phrases in the intents database 878. In some instances, the determination of an intent by the IC component 864 is performed using a set of rules or templates that are processed against the incoming text to identify a matching intent.

In order to generate a particular interpreted response, the NER 862 applies the grammar models and lexical information associated with the respective domain to actually recognize a mention of one or more entities in the text of the query. In this manner, the NER 862 identifies "slots" or values (i.e., particular words in query text) that may be needed for later command processing. Depending on the complexity of the NER 862, it may also label each slot with a type of varying levels of specificity (such as noun, place, device name, device location, city, artist name, song name, amount of time, timer number, or the like). Each grammar model 876 includes the names of entities (i.e., nouns) commonly found in speech about the particular domain (i.e., generic terms), whereas the lexical information 886 from the gazetteer 884 is personalized to the user(s) and/or the device. For instance, a grammar model associated with the shopping domain may include a database of words commonly used when people discuss shopping.

The intents identified by the IC component 864 are linked to domain-specific grammar frameworks (included in 876) with "slots" or "fields" to be filled with values. Each slot/field corresponds to a portion of the query text that the system believes corresponds to an entity. To make resolution more flexible, these frameworks would ordinarily not be structured as sentences, but rather based on associating slots with grammatical tags. For example, if "turn on" is an identified intent, a grammar (876) framework or frameworks may correspond to sentence structures such as "turn {Kitchen Light} on."

For example, the NER component 862 may parse the query to identify words as subject, object, verb, preposition, etc., based on grammar rules and/or models, prior to recognizing named entities. The identified verb may be used by the IC component 864 to identify intent, which is then used by the NER component 862 to identify frameworks. A framework for the intent of "play a song," meanwhile, may specify a list of slots/fields applicable to play the identified "song" and any object modifier (e.g., specifying a music collection from which the song should be accessed) or the like. The NER component 862 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

The frameworks linked to the intent are then used to determine what database fields should be searched to determine the meaning of these phrases, such as searching a user's gazette for similarity with the framework slots. If the search of the gazetteer does not resolve the slot/field using gazetteer information, the NER component 862 may search the database of generic words associated with the domain (in the knowledge base 872). So, for instance, if the query was "turn on Kitchen Light," after failing to determine which connected device corresponds to the naming indicator of Kitchen Light, the NER component 862 may search the domain vocabulary for connected device naming indicators that have been requested lately. In the alternative, generic words may be checked before the gazetteer information, or both may be tried, potentially producing two different results.

The output data from the NLU processing (which may include tagged text, commands, etc.) may then be sent to a speechlet 154. The destination speechlet 154 may be determined based on the NLU output. For example, if the NLU output includes a command to send a message, the destination speechlet 154 may be a message sending application, such as one located on the user device or in a message sending appliance, configured to execute a message sending command. If the NLU output includes a search request, the destination speechlet 154 may include a search engine processor, such as one located on a search server, configured to execute a search command. After the appropriate command is generated based on the intent of the user, the speechlet 154 may provide some or all of this information to a text-to-speech (TTS) engine. The TTS engine may then generate an actual audio file for outputting the audio data determined by the speechlet 154 (e.g., "okay," or "Kitchen Light on"). After generating the file (or "audio data"), the TTS engine may provide this data back to the remote system 108.

The NLU operations of existing systems may take the form of a multi-domain architecture. Each domain (which may include a set of intents and entity slots that define a larger concept such as music, books etc. as well as components such as trained models, etc. used to perform various NLU operations such as NER, IC, or the like) may be constructed separately and made available to an NLU component 150 during runtime operations where NLU operations are performed on text (such as text output from an ASR component 148). Each domain may have specially configured components to perform various steps of the NLU operations.

For example, in a NLU system, the system may include a multi-domain architecture consisting of multiple domains for intents/commands executable by the system (or by other devices connected to the system), such as music, video, books, and information. The system may include a plurality of domain recognizers, where each domain may include its own recognizer 863. Each recognizer may include various NLU components such as an NER component 862, IC component 864 and other components such as an entity resolver, or other components.

For example, a messaging domain recognizer 863-A (Domain A) may have an NER component 862-A that identifies what slots (i.e., portions of input text) may correspond to particular words relevant to that domain. The words may correspond to entities such as (for the messaging domain) a recipient. An NER component 862 may use a machine learning model, such as a domain specific conditional random field (CRF) to both identify the portions corresponding to an entity as well as identify what type of entity corresponds to the text portion. The messaging domain recognizer 863-A may also have its own intent classification (IC) component 864-A that determines the intent of the text assuming that the text is within the proscribed domain. An IC component may use a model, such as a domain specific maximum entropy classifier to identify the intent of the text, where the intent is the action the user desires the system to perform. For this purpose, the remote system computing device 108 may include a model training component. The model training component may be used to train the classifier(s)/machine learning models discussed above.

As noted above, multiple devices may be employed in a single speech-processing system. In such a multi-device system, each of the devices may include different components for performing different aspects of the speech processing. The multiple devices may include overlapping components. The components of the user device and the remote system 108, as illustrated herein are exemplary, and may be located in a stand-alone device or may be included, in whole or in part, as a component of a larger device or system, may be distributed across a network or multiple devices connected by a network, etc.

Figure 9:
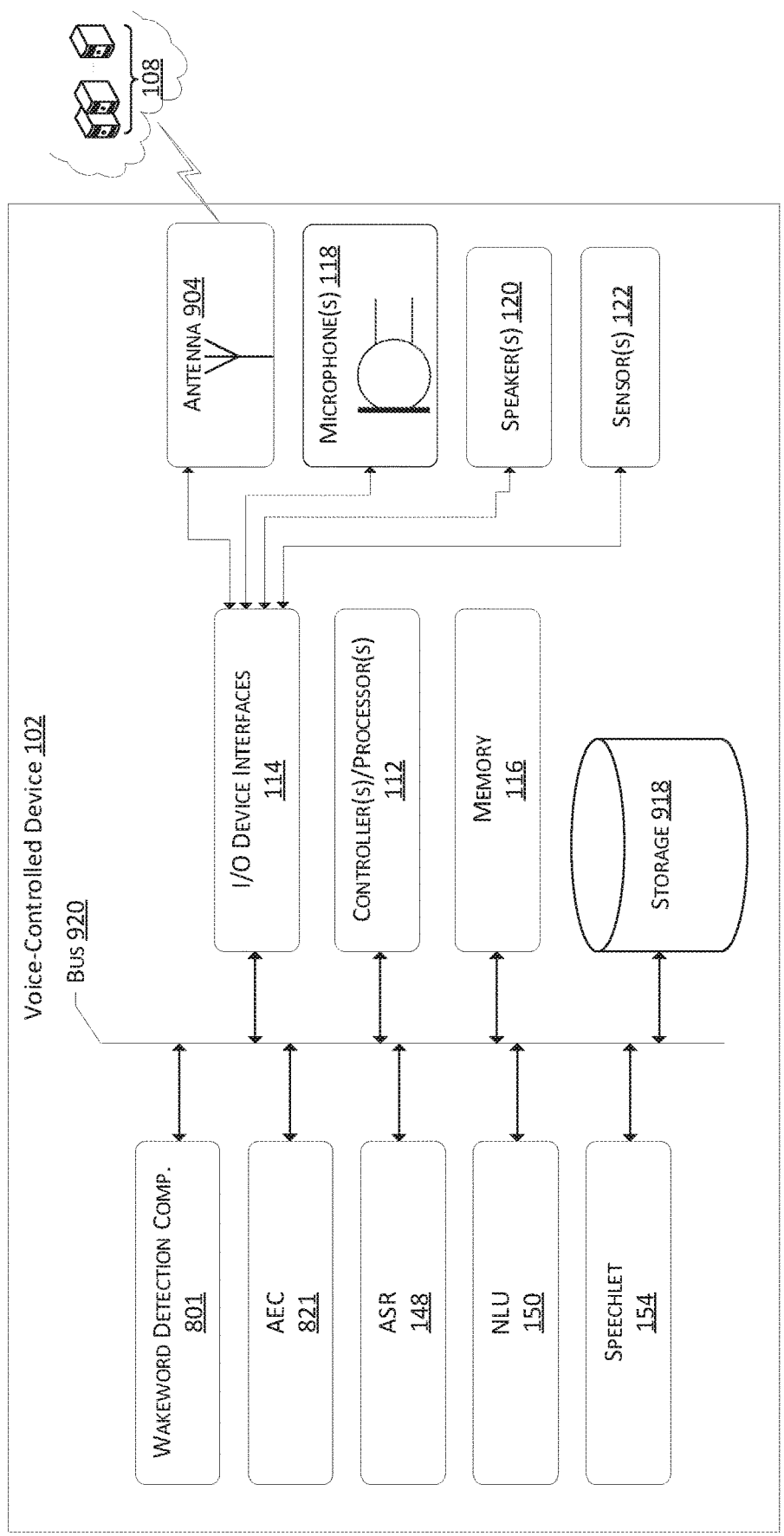
FIG. 9 illustrates a conceptual diagram of example components of a voice-controlled device configured for facilitating device functionality identification.

FIG. 9 illustrates a conceptual diagram of example components of a voice-controlled device configured for facilitating device functionality identification. The voice-controlled device 102 may be implemented as a standalone device that is relatively simple in terms of functional capabilities with limited input/output components, memory, and processing capabilities. For instance, the voice-controlled device 102 may not have a keyboard, keypad, touchscreen, or other form of mechanical input. In some instances, the device 102 may include a microphone 118, a power source, and functionality for sending generated audio data via one or more antennas 904 to another device and/or system.

The device 102 may also be implemented as a more sophisticated computing device, such as a computing device similar to, or the same as, a smart phone or personal digital assistant. The device 102 may include a display with a touch interface and various buttons for providing input as well as additional functionality such as the ability to send and receive communications. Alternative implementations of the device 102 may also include configurations as a personal computer. The personal computer may include input devices such as a keyboard, a mouse, a touchscreen, and other hardware or functionality that is found on a desktop, notebook, netbook, or other personal computing devices. In examples, the device 102 may include an automobile, such as a car. In other examples, the device 102 may include a pin on a user's clothes or a phone on a user's person. In examples, the device 102 and may not include speaker(s) and may utilize speaker(s) of an external or peripheral device to output audio via the speaker(s) of the external/peripheral device. In this example, the device 102 might represent a set-top box (STB), and the device 102 may utilize speaker(s) of another device such as a television that is connected to the STB for output of audio via the external speakers. In other examples, the device 102 may not include the microphone(s) 118, and instead, the device 102 can utilize microphone(s) of an external or peripheral device to capture audio and/or generate audio data. In this example, the device 102 may utilize microphone(s) of a headset that is coupled (wired or wirelessly) to the device 102. These types of devices are provided by way of example and are not intended to be limiting, as the techniques described in this disclosure may be used in essentially any device that has an ability to recognize speech input or other types of natural language input.

The device 102 of FIG. 9 may include one or more controllers/processors 112, that may include a central processing unit (CPU) for processing data and computer-readable instructions, and memory 116 for storing data and instructions of the device 102. In examples, the skills and/or applications described herein may be stored in association with the memory 116, which may be queried for content and/or responses as described herein. The device 102 may also be connected to removable or external non-volatile memory and/or storage, such as a removable memory card, memory key drive, networked storage, etc., through input/output device interfaces 114.

Computer instructions for operating the device 102 and its various components may be executed by the device's controller(s)/processor(s) 112, using the memory 116 as temporary "working" storage at runtime. A device's computer instructions may be stored in a non-transitory manner in non-volatile memory 116, storage 918, or an external device(s). Alternatively, some or all of the executable instructions may be embedded in hardware or firmware on the device 102 in addition to or instead of software.

The device 102 may include input/output device interfaces 114. A variety of components may be connected through the input/output device interfaces 114. Additionally, the device 102 may include an address/data bus 920 for conveying data among components of the respective device. Each component within a device 102 may also be directly connected to other components in addition to, or instead of, being connected to other components across the bus 920.

The device 102 may include a display, which may comprise a touch interface. Any suitable display technology, such as liquid crystal display (LCD), organic light emitting diode (OLED), electrophoretic, and so on, may be utilized for the displays. Furthermore, the processor(s) 112 may comprise graphics processors for driving animation and video output on the associated display. As a way of indicating to a user that a connection between another device has been opened, the device 102 may be configured with one or more visual indicators, such as the light element(s), which may be in the form of LED(s) or similar components (not illustrated), that may change color, flash, or otherwise provide visible light output, such as for a notification indicator on the device 102. The input/output device interfaces 114 that connect to a variety of components. This wired or a wireless audio and/or video port may allow for input/output of audio/video to/from the device 102. The device 102 may also include an audio capture component. The audio capture component may be, for example, a microphone 118 or array of microphones, a wired headset or a wireless headset, etc. The microphone 118 may be configured to capture audio. If an array of microphones is included, approximate distance to a sound's point of origin may be determined using acoustic localization based on time and amplitude differences between sounds captured by different microphones of the array. The device 102 (using microphone 118, wakeword detection component 801, ASR component 148, etc.) may be configured to generate audio data corresponding to captured audio. The device 102 (using input/output device interfaces 114, antenna 904, etc.) may also be configured to transmit the audio data to the remote system 108 for further processing or to process the data using internal components such as a wakeword detection component 801.

The device 102 may also include one or more environmental sensors 122. The one or more sensors 122 may include components that allow the voice-controlled device 102 to detect one or more environmental changes associated with the environment in which the voice-controlled device 102 is disposed. Examples of the sensors 122 include, but are not limited to, light sensors such as ambient light sensors, microphones, temperature sensors, an infrared sensor, one or more radar sensors, a motion sensor, a camera, and/or any other device that may sense a change in one or more conditions of an environment.

Via the antenna(s) 904, the input/output device interface 114 may connect to one or more networks via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Universal Serial Bus (USB) connections may also be supported. Power may be provided to the device 102 via wired connection to an external alternating current (AC) outlet, and/or via onboard power sources, such as batteries, solar panels, etc.

Through the network(s), the system may be distributed across a networked environment. Accordingly, the device 102 and/or the remote system 108 may include an ASR component 148. The ASR component 148 of device 102 may be of limited or extended capabilities. The ASR component 148 may include language models stored in ASR model storage component, and an ASR component 148 that performs automatic speech recognition. If limited speech recognition is included, the ASR component 148 may be configured to identify a limited number of words, such as keywords detected by the device, whereas extended speech recognition may be configured to recognize a much larger range of words.

The device 102 and/or the remote system 108 may include a limited or extended NLU component 150. The NLU component 150 of device 102 may be of limited or extended capabilities. The NLU component 150 may comprise a name entity recognition module, an intent classification module and/or other components. The NLU component 150 may also include a stored knowledge base and/or entity library, or those storages may be separately located.

In examples, AEC may also be performed by the device 102. In these examples, the operations may include causing the AEC component 821 to be enabled or otherwise turned on, or the operations may include causing the AEC component 821 to transition from a first mode to a second mode representing a higher sensitivity to audio data generated by the microphone 118. The AEC component 821 may utilize the audio data generated by the microphone 118 to determine if an audio fingerprint of the audio data, or portion thereof, corresponds to a reference audio fingerprint associated with the predefined event.

The device 102 and/or the remote system 108 may also include a speechlet 154 that is configured to execute commands/functions associated with a spoken command as described herein. The device 102 may include a wakeword detection component 801, which may be a separate component or may be included in an ASR component 148. The wakeword detection component 801 receives audio signals and detects occurrences of a particular expression (such as a configured keyword) in the audio. This may include detecting a change in frequencies over a specific period of time where the change in frequencies results in a specific audio fingerprint that the system recognizes as corresponding to the keyword. Keyword detection may include analyzing individual directional audio signals, such as those processed post-beamforming if applicable. Other techniques known in the art of keyword detection (also known as keyword spotting) may also be used. In some embodiments, the device 102 may be configured collectively to identify a set of the directional audio signals in which the wake expression is detected or in which the wake expression is likely to have occurred.

Figure 10:
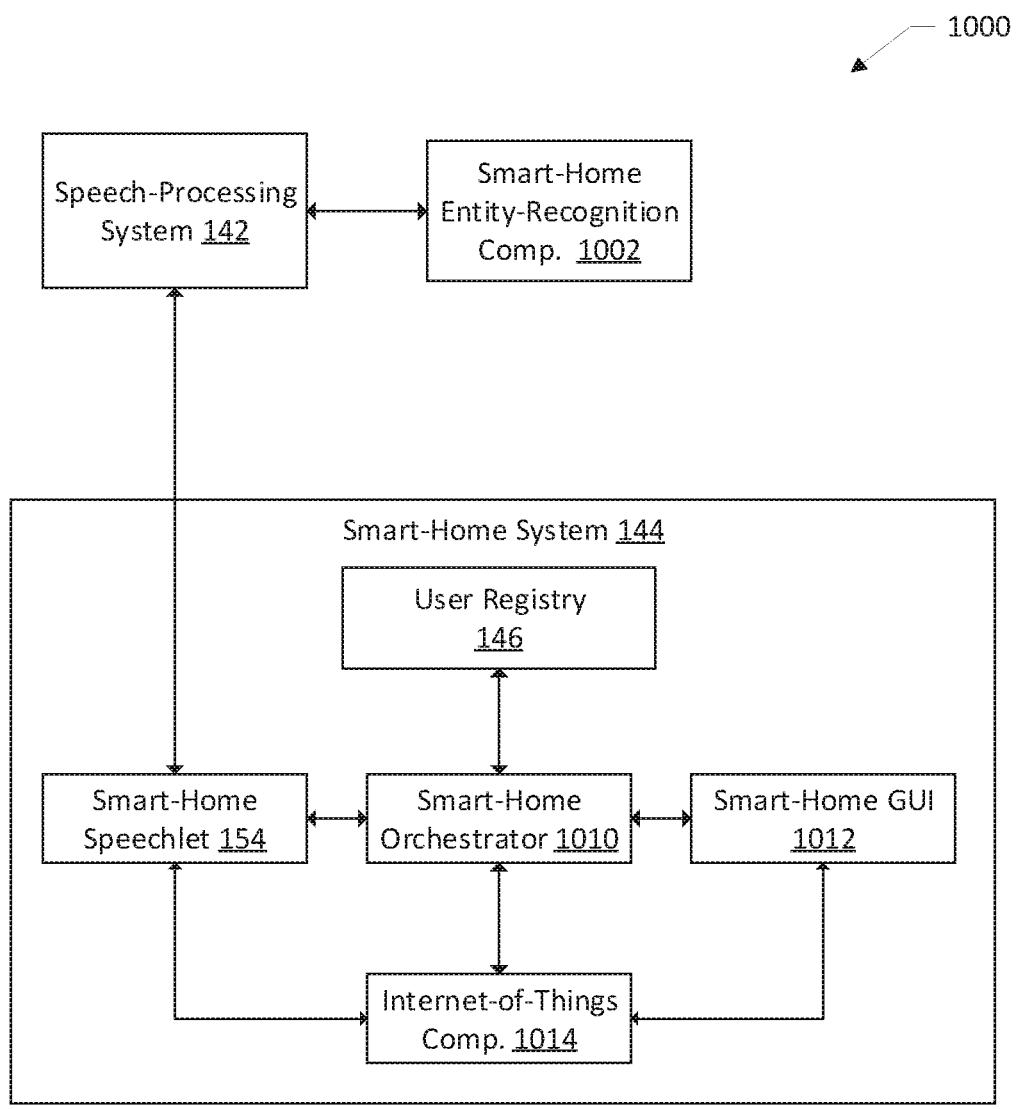
FIG. 10 illustrates a conceptual diagram of example components of a smart-home system that may be utilized for device functionality identification.

FIG. 10 illustrates a conceptual diagram of example components of a smart-home system that may be utilized for device functionality identification. The smart-home system 144 may include components described above with respect to FIG. 1, such as a smart-home speechlet 154, for example. The smart-home system 144 may also be configured to send data to and receive data from other components of a system and/or one or more other systems. For example, the other components may include a speech-processing system 142. The smart-home system 144 may also include components such as a smart-home orchestrator 1010, a smart-home graphical user interface (GUI) 1012, and/or an internet-of-things component 1014. Each of these components will be described in detail below.

As described herein, a user may interact with a smart device using tactile input to the smart device, voice input to a voice-controlled device, and/or input to an application residing on and/or accessible to a personal device. When a user interacts with a smart device using voice input to a voice-controlled device, audio data representing user utterances may be received at the speech-processing system 142. The speech-processing system 142 may analyze the audio data and/or corresponding text data generated, by way of example, using an ASR component, to determine that the user utterance represents an intent to control a smart device. To determine the intent associated with the user utterance, the speech-processing system 142 may utilize a smart-home entity-recognition component 1002, which may be utilized to inform one or more intents available to the speech-processing system 142 and/or to inform one or more values associated with the intents. For example, the user utterance of "turn off bedroom lights" may be analyzed by the speech-processing system 142. The smart-home entity-recognition component 1002 may train or otherwise provide data to the speech-processing system 142 indicating intents associated with operation of smart devices, such as "turn on," "turn off," "activate," "deactivate," "dim," "brighten," "lock," "unlock," etc. The smart-home entity-recognition component 1002 may additionally, or alternatively, provide data indicating identifiers and/or payloads associated with such intents, such as "light," "lights," "lock," "outlet," "switch," etc. It should be understood that while the smart-home entity-recognition component 1002 is depicted in FIG. 10 as being a component separate from the smart-home system 144, the smart-home entity-recognition component 1002 may be a component of the smart-home system 144.

The speech-processing system 142 may be configured to determine that the intent corresponds to an operation configured to be performed by the smart-home system 144, and based at least in part on such a determination, the speech-processing system 142 may provide the intent data and/or other data associated with the request to the smart-home speechlet 154 of the smart-home system 144. The smart-home orchestrator 1010 may be configured to receive data indicating that the smart-home speechlet 154 has been invoked to determine a directive to be performed with respect to a smart device and may query one or more other components of the smart-home system 144 to effectuate the request. For example, the smart-home orchestrator 1010 may query the internet-of-things component 1014 to identify naming indicators associated with smart devices for a particular user account. The internet-of-things component 1014 may query data store(s) and/or the user registry 146 and/or the user account for such naming indicators.

In other examples, such as when the smart-home speechlet 154 receives a request to discover a smart device, such as from a smart-device system, the smart-home orchestrator 1010 may query one or more components of the smart-home system 144 to determine associations between smart device identifiers and user account identifiers as described herein. Additionally, or alternatively, as mentioned above, the smart devices may be operated based at least in part on input data received from an application residing on and/or accessible to a personal device, such as a mobile phone and/or computer. The smart-home GUI 1012 may be utilized to receive the input data and/or to display recommendations and/or requests to a user. For example, the smart-home GUI 1012 may be utilized to display a request to confirm that a selected smart device is the desired device to be acted upon.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:

1. A system, comprising:
one or more processors; and
non-transitory computer-readable media storing computer-executable instructions that, when executed by the one or more processors, cause the one or more processors to perform operations comprising:
receiving input data requesting operation of a first device, wherein the first device is associated with a first device type;
sending a command to cause the first device to operate;
generating request data for first user input to associate the first device with a secondary device type after sending the command;
receiving a response to the request data; and
based at least in part on the response, causing account data associated with the first device to indicate that the first device is of the secondary device type instead of the first device being of the first device type that the first device was associated with prior to sending the command.

2. The system of claim 1, the operations further comprising receiving, from a voice-controlled device, audio data representing a user utterance, wherein the input data comprises the user utterance.

3. The system of claim 2, the operations further comprising:
determining that the account data is associated with the voice-controlled device and the first device;
determining that the account data indicates a grouping of electronic devices associated with the secondary device type;
generating, in response to causing the first device to be associated with the secondary device type, additional data representing a notification requesting additional user input to associate the first device with the grouping of electronic devices; and
causing the first device to be associated with the grouping of electronic devices in response to receiving data representing the additional user input.

4. The system of claim 2, the operations further comprising:
identifying, utilizing the account data associated with the voice-controlled device and in response to determining that the first device is associated with the secondary device type, one or more devices associated with the first device that include at least one ambient-light sensor, the one or more devices including the voice-controlled device;
selecting the voice-controlled device to send an operation command indicating that the voice-controlled device has been utilized to control operation of the first device; and
sending the operation command to the voice-controlled device in response to selecting the voice-controlled device.

5. A method, comprising:
receiving input data requesting operation of a first device, wherein the first device is associated with a first device type;
sending a command to cause the first device to operate;
generating request data for first user input to associate the first device with a secondary device type after sending the command;
receiving a response to the request data; and
based at least in part on the response, causing the first device to be associated with the secondary device type that is different than the first device type.

6. The method of claim 5, further comprising receiving, from a voice-controlled device, audio data representing a user utterance, wherein the input data comprises the user utterance.

7. The method of claim 5, further comprising:
determining account data associated with the first device;
determining that the account data indicates a grouping of devices associated with the secondary device type;
generating first data representing a notification requesting additional user input to associate the first device with the grouping of devices; and
causing the first device to be associated with the grouping of devices based at least in part on receiving response data representing the additional user input.

8. The method of claim 5, further comprising:
identifying, utilizing account data associated with the first device, one or more devices associated with the first device that include at least one environmental sensor, the one or more devices including a second device;
selecting the second device to send an activation command to based at least in part on first data indicating the second device has been utilized to control operation of the first device; and
sending the activation command to the second device based at least in part on selecting the second device.

9. The method of claim 5, further comprising:
receiving state-change data indicating that an operational state of the first device has changed;
determining that sensor data was received within a threshold amount of time of receipt of the state-change data; and
wherein causing the first device to be associated with the secondary device type comprises causing the first device to be associated with the secondary device type based at least in part on determining that the sensor data was received within the threshold amount of time of receipt of the state-change data.

10. The method of claim 9, wherein:
the sensor data indicates a change in temperature; and
the secondary device type represents a heating device.

11. The method of claim 9, wherein:
the sensor data indicates a change in audio captured by a microphone of a second device; and
the second device type represents an audio-output device.

12. The method of claim 5, further comprising:
determining account data associated with the first device;
determining that the account data indicates that an automated operation has been set to be performed by a group of devices associated with the secondary device type;
generating first data representing a notification requesting additional user input to associate the first device with the automated operation; and causing the first device to be associated with the automated operation based at least in part on receiving response data representing the additional user input.

13. A system, comprising:
one or more processors; and
non-transitory computer-readable media storing computer-executable instructions that, when executed by the one or more processors, cause the one or more processors to perform operations comprising:
receiving input data requesting operation of a first device, wherein the first device is associated with a first device type;
sending a command to cause the first device to operate;
generating request data for first user input to associate the first device with a secondary device type after sending the command;
receiving a response to the request data; and
based at least in part on the response, causing the first device to be associated with the secondary device type that is different than the first device type.

14. The system of claim 13, the operations further comprising:
determining account data associated with the first device;
determining that the account data indicates a second device having the secondary device type; and
generating first data representing a notification requesting additional user input to associate the first device and the second device with the secondary device type.

15. The system of claim 13, the operations further comprising:
determining account data associated with the first device;
determining that the account data indicates a grouping of devices associated with the secondary device type;
generating first data representing a notification requesting additional user input to associate the first device with the grouping of devices; and
causing the first device to be associated with the grouping of devices based at least in part on receiving response data representing the additional user input.

16. The system of claim 13, the operations further comprising:
identifying, utilizing account data associated with the first device, one or more devices associated with the first device that include at least one environmental sensor, the one or more devices including a second device;
selecting the second device to an activation command to based at least in part on data indicating the second device has been utilized to control operation of the first device; and
sending the activation command to the second device based at least in part on selecting the second device.

17. The system of claim 13, the operations further comprising:
receiving state-change data indicating that an operational state of the first device has changed;
determining that sensor data was received within a threshold amount of time of receipt of the state-change data; and
wherein causing the first device to be associated with the secondary device type comprises causing the first device to be associated with the secondary device type based at least in part on determining that the sensor data was received within the threshold amount of time of receipt of the state-change data.

18. The system of claim 17, wherein:
the sensor data indicates a change in temperature; and
the secondary device type represents a heating device.

19. The system of claim 17, wherein:
the sensor data indicates a change in audio captured by a microphone of a second device; and
the secondary device type represents an audio-output device.

20. The system of claim 13, the operations further comprising:
determining account data associated with the first device;
determining that the account data indicates that an automated operation has been set to be performed by a group of devices associated with the secondary device type;
generating first data representing a notification requesting additional user input to associate the first device with the automated operation; and
causing the first device to be associated with the automated operation based at least in part on receiving response data representing the additional user input.

* * * * *